(12) United States Patent
Muthusamy et al.

(10) Patent No.: US 12,280,495 B2
(45) Date of Patent: Apr. 22, 2025

(54) ROBOTIC MANIPULATOR WITH CAMERA AND TACTILE SENSING

(71) Applicant: Khalifa University of Science and Technology, Abu Dhabi (AE)

(72) Inventors: Rajkumar Muthusamy, Abu Dhabi (AE); Huda Alyammahi, Abu Dhabi (AE); Muhammad Umer Hameed Shah, Abu Dhabi (AE); Omar Fuad Faris, Abu Dhabi (AE); Irfan Hussain, Abu Dhabi (AE); Yahya Hashem Zweiri, Abu Dhabi (AE); Dongming Gan, Abu Dhabi (AE); Seneviratne Mudigansalage Seneviratne, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 64 days.

(21) Appl. No.: 17/900,770

(22) Filed: Aug. 31, 2022

(65) Prior Publication Data
US 2023/0072207 A1 Mar. 9, 2023

Related U.S. Application Data

(60) Provisional application No. 63/241,212, filed on Sep. 7, 2021.

(51) Int. Cl.
*B25J 19/02* (2006.01)
*B25J 13/08* (2006.01)

(52) U.S. Cl.
CPC ........... *B25J 19/023* (2013.01); *B25J 13/084* (2013.01)

(58) Field of Classification Search
CPC .................. B25J 19/023; G05B 2219/39369
See application file for complete search history.

(56) References Cited

U.S. PATENT DOCUMENTS

| | | | |
|---|---|---|---|
| 2016/0107316 A1 | 4/2016 | Alt et al. | |
| 2017/0328795 A1 | 11/2017 | Alt et al. | |
| 2018/0302562 A1 | 10/2018 | Newcombe et al. | |
| 2021/0023714 A1* | 1/2021 | Zhang | H04N 13/254 |
| 2021/0023715 A1 | 1/2021 | Zhang et al. | |
| 2021/0107166 A1 | 4/2021 | Yerazunis et al. | |
| 2021/0187735 A1 | 6/2021 | Homberg et al. | |
| 2023/0018498 A1* | 1/2023 | Kaehler | B25J 9/161 |

(Continued)

FOREIGN PATENT DOCUMENTS

| | | | | |
|---|---|---|---|---|
| CA | 3214123 A1 * | 10/2022 | ............ | B25J 13/082 |
| CN | 112809679 A | 5/2021 | | |

(Continued)

OTHER PUBLICATIONS

"Application Manual", ABB, 2018, 292 pages.

(Continued)

*Primary Examiner* — Karen Masih
(74) *Attorney, Agent, or Firm* — Kilpatrick Townsend & Stockton LLP

(57) ABSTRACT

A robotic manipulator is described. The robotic manipulator includes a rigid or semi-rigid end effector that engages with objects and a sensor that detects data associated with the object. For example, the sensor can include an optical sensor or a vision-based tactile sensor that detects data associated with the object.

18 Claims, 19 Drawing Sheets

(56) References Cited

U.S. PATENT DOCUMENTS

| | | | |
|---|---|---|---|
| 2023/0294306 A1 | 9/2023 | Nicholas | |
| 2023/0330859 A1 | 10/2023 | Tee et al. | |

FOREIGN PATENT DOCUMENTS

| | | | | |
|---|---|---|---|---|
| CN | 116038666 A | * | 5/2023 | |
| GB | 2134071 A | * | 8/1984 | ............. B23K 26/02 |
| GB | 2605423 A | | 10/2022 | |
| WO | 2022025893 A1 | | 2/2022 | |
| WO | 2022207853 A1 | | 10/2022 | |

OTHER PUBLICATIONS

"Force Sensors", Kistler, 2019, 42 pages.

"Force/Torque Sensors", JR3 Inc., Accessed from Internet on Nov. 7, 2020, 1 page.

"Multi-Axis Force/Torque Sensor", ATI Industrial Automation, 2014, 44 pages.

"Neuromorphic Sensing and Computing", Yole Dveloppement, Available Online at https://yole-i-micronews-com.osu.eu-west-2.outscale.com/uploads/2019/ 09/YD19039 Neuromorphic Sensing Computing 2019 sample, 2019, 44 pages.

"Prophesee and Sony Develop a Stacked Event-Based Vision Sensor with the Industry's Smallest Pixels and Highest HDR", Available Online at: https://www.prophesee.ai/2020/02/19/prophesee-sony-stacked-event-based-vision-sensor/, 2020, pp. 1-10.

Abad et al., "Visuotactile Sensors With Emphasis on Gelsight Sensor: A Review", IEEE Sensors Journal, vol. 20, No. 14, Mar. 2020, pp. 7628-7638.

Aceto et al., "A Survey on Information and Communication Technologies for Industry 4.0: State-of-the-art, Taxonomies, Perspectives, and Challenges", IEEE Communications Surveys & Tutorials, vol. 21, No. 4, Aug. 2019, pp. 3467-3501.

Al Khawli et al., "Introducing Data Analytics to the Robotic Drilling Process", Industrial Robot, vol. 45, No. 3, Jun. 2018, pp. 371-378.

Alzarok et al., "3D Visual Tracking of an Articulated Robot in Precision Automated Tasks", Sensors, vol. 17, No. 1, Jan. 2017, pp. 1-23.

Assaf et al., "Seeing by Touch: Evaluation of a Soft Biologically-Inspired Artificial Fingertip in Real-time Active Touch", Sensors, vol. 14, No. 2, Feb. 2014, pp. 2561-2577.

Caggiano et al., "Study on Thrust Force and Torque Sensor Signals in Drilling of Al/CFRP Stacks for Aeronautical Applications", Procedia CIRP, vol. 79, Jan. 2019, pp. 337-342.

Cantwell et al., "The Impact Resistance of Composite Materials—A Review", Composites, vol. 22, No. 5, Sep. 1991, pp. 347-362.

Chen et al., "Robotic Grinding of a Blisk With Two Degrees of Freedom Contact Force Control", The International Journal of Advanced Manufacturing, 2019, pp. 461-474.

Chen et al., "Tactile Sensors for Friction Estimation and Incipient Slip Detection Toward Dexterous Robotic Manipulation: A Review", IEEE Sensors Journal, vol. 18, No. 22, Nov. 2018, pp. 9049-9064.

Chorley et al., "Development of a Tactile Sensor Based on Biologically Inspired Edge Encoding", 2009 International Conference on Advanced Robotics, Jun. 2009, pp. 1-6.

De La Puente et al., "Grasping Objects From the Floor in Assistive Robotics: Real World Implications and Lessons Learned", IEEE Access, vol. 7, Aug. 2019, pp. 123725-123735.

Devlieg et al., "High-Accuracy Robotic Drilling/Milling of 737 Inboard Flaps", SAE International Journal of Aerospace, vol. 4, No. 2, 2011, pp. 1373-1379.

Ding et al., "Research and Application on Force Control of Industrial Robot Polishing Concave Curved Surfaces", Proceedings of the Institution of Mechanical Engineers Part B Journal of Engineering Manufacture, vol. 233, No. 6, 2018, pp. 1674-1686.

Domroes et al., "Application and Analysis of Force Control Strategies to Deburring and Grinding", Modern Mechanical Engineering, vol. 3, No. 2, Jun. 2013, pp. 11-18.

Frommknecht et al., "Multi-Sensor Measurement System for Robotic Drilling", Robotics and Computer-Integrated Manufacturing, vol. 47, Dec. 2015, pp. 1-8.

Hristu et al., "The Performance of a Deformable-Membrane Tactile Sensor: Basic Results on Geometrically Defined Tasks", Proceedings—IEEE International Conference on Robotics and Automation. Symposia Proceedings (Cat. No. 00CH37065), vol. 1, Feb. 2000, pp. 508-513.

Hughes et al., "Soft Manipulators and Grippers: A Review", Frontiers in Robotics and AI, vol. 3, Nov. 2016, pp. 1-12.

Indiveri et al., "Neuromorphic Vision Sensors", Science, 288, No. 5469, May 2000, pp. 1189-1190.

Ito et al., "Shape Sensing by Vision Based Tactile Sensor for Dexterous Handling of Robot Hands", 2010 IEEE International Conference on Automation Science and Engineering, Aug. 21-24, 2010, pp. 574-579.

Ji et al., "Industrial Robotic Machining: A Review", The International Journal of Advanced Manufacturing Technology, vol. 103, No. 1-4, Apr. 2019, pp. 1239-1255.

Johnson et al., "Retrographic Sensing for the Measurement of Surface Texture and Shape", 2009 IEEE Conference on Computer Vision and Pattern Recognition (CVPR), Jun. 2009, pp. 1070-1077.

Jung, "Biohybrid Systems: Nerves, Interfaces and Machines", John Wiley & Sons, Oct. 19, 2011, 223.

Karim et al., "Challenges and Obstacles in Robot-Machining", 2013 44th International Symposium on Robotic, Oct. 2013, 4 pages.

Kumagai et al., "Event-Based Tactile Image Sensor for Detecting Spatio-Temporal Fast Phenomena in Contacts", 2019 IEEE World Haptics Conference, WHC, Jul. 2019, pp. 343-348.

Li et al., "Localization and Manipulation of Small Parts Using Gelsight Tactile Sensing", 2014 IEEE/RSJ International Conference on Intelligent Robots and Systems, Sep. 14-18, 2014, pp. 3988-3993.

Lichtsteiner et al., "A 128×128 120 dB 15 µS Latency Asynchronous Temporal Contrast Vision Sensor", IEEE Journal of Solid-state Circuits, IEEE Service Center, vol. 43, No. 2, Feb. 1, 2008, pp. 566-576.

Liu et al., "Neuromorphic Sensory Systems", Current Opinion in Neurobiology, vol. 20, No. 3, Jun. 2010, pp. 288-295.

Muthusamy et al., "Neuromorphic Event-Based Slip Detection and Suppression in Robotic Grasping and Manipulation", IEEE Access, vol. 8, Aug. 2020, pp. 153364-153384.

Muthusamy et al., "Neuromorphic Eye-in-Hand Visual Servoing", IEEE Access, vol. 9, Apr. 2021, pp. 55853-55870.

Naeini et al., "A Novel Dynamic-Vision-Based Approach for Tactile Sensing Applications", IEEE Transactions on Instrumentation and Measurement, vol. 69, No. 5, May 2020, pp. 1881-1893.

Nakagawa-Silva et al., "A Bio-Inspired Slip Detection and Reflex-like Suppression Method for Robotic Manipulators", IEEE Sensors Journal, vol. 19, No. 24, Dec. 2019, pp. pp. 12443-12453.

Olsson et al., "Cost-Efficient Drilling Using Industrial Robots With High-bandwidth Force Feedback", Robotics and Computer-Integrated Manufacturing, vol. 26, No. 1, Feb. 2010, pp. 24-38.

Rigi et al., "A Novel Event-Based Incipient Slip Detection Using Dynamic Active-Pixel Vision Sensor (DAVIS)", Sensors, vol. 18, No. 2, Jan. 2018, pp. 1-17.

Romano et al., "Human-Inspired Robotic Grasp Control With Tactile Sensing", IEEE Transactions on Robotics, vol. 27, No. 6, Dec. 2011, pp. 1067-1079.

Rosa et al., "Analysis and Implementation of a Force Control Strategy for Drilling Operations With an Industrial Robot", Journal of the Brazilian Society of Mechanical Sciences and Engineering, vol. 39, No. 11, Sep. 2017, pp. 4749-4756.

She et al., "Exoskeleton-covered Soft Finger With Vision-Based Proprioception and Tactile Sensing", 2020 IEEE International Conference on Robotics and Automation (ICRA), May 31-Aug. 31, 2020, pp. 10075-10081.

Sun et al., "Design and Performance Analysis of an Industrial Robot Arm for Robotic Drilling Process", he Industrial Robot; Bedford, vol. 46, No. 1, Apr. 12, 2019, pp. 7-16.

Tiwana et al., "A Review of Tactile Sensing Technologies With Applications in Biomedical Engineering", Sensors and Actuators A: Physical, vol. 179, Jun. 2012, pp. 17-31.

(56) References Cited

OTHER PUBLICATIONS

Trueb et al., "Towards Vision-based Robotic Skins: A Data-Driven, Multi-Camera Tactile Sensor", 2020 3rd IEEE International Conference on Soft Robotics (RoboSoft), Oct. 2019, 6 pages.

Vallbo et al., "Properties of Cutaneous Mechanoreceptors in the Human Hand Related to Touch Sensation", Human Neurobiology, vol. 3, No. 1, Feb. 1984, pp. 3-14.

Vanarse et al., "A Review of Current Neuromorphic Approaches for Vision, Auditory, and Olfactory Sensors", Frontiers in neuroscience, vol. 10, No. 115, Mar. 29, 2016, pp. 1-6.

Wang et al., "Real-Time Soft Body 3d Proprioception via Deep Vision-Based Sensing", IEEE Robotics and Automation Letters, vol. 5, No. 2, Apr. 2020, pp. 3382-3389.

Ward-Cherrier et al., "A Miniaturised Neuromorphic Tactile Sensor Integrated With an Anthropomorphic Robot Hand", 2020 IEEE/RSJ International Conference on Intelligent Robots and Systems (IROS), Oct. 2020, pp. 9883-9889.

Ward-Cherrier et al., "NeuroTac: A Neuromorphic Optical Tactile Sensor applied to Texture Recognition", 2020 IEEE International Conference on Robotics and Automation (ICRA), May 2020, pp. 2654-2660.

Ward-Cherrier et al., "The Tactip Family: Soft Optical Tactile Sensors With 3d-Printed Biomimetic Morphologies", Soft Robotics, vol. 5, No. 2, 2018, pp. 216-227.

Xie et al., "Design of Robotic End-effector for Milling Force Control", IOP Conference Series: Materials Science and Engineering, vol. 423, May 2018, pp. 1-6.

Xu et al., "A Visual Seam Tracking System for Robotic Arc Welding", The International Journal of Advanced Manufacturing Technology, vol. 37, No. 1, Apr. 2008, pp. 70-75.

Yamaguchi et al., "Combining Finger Vision and Optical Tactile Sensing: Reducing and Handling Errors While Cutting Vegetables", 2016 IEEE-RAS 16th International Conference on Humanoid Robots (Humanoids), Nov. 15-17, 2016, pp. 1045-1051.

Yamaguchi et al., "Grasp Adaptation Control With Finger Vision: Verification With Deformable and Fragile Objects", 35th Annual Conference of the Robotics Society of Japan (RSJ2017), Sep. 2017, 3 pages.

Yuan et al., "GelSight: High-Resolution Robot Tactile Sensors for Estimating Geometry and Force", Sensors, vol. 17, No. 12, Nov. 2017, pp. 1-21.

Yuan et al., "Shape-Independent Hardness Estimation Using Deep Learning and a Gelsight Tactile Sensor", 2017 IEEE International Conference on Robotics and Automation (ICRA), Apr. 2017, 8 pages.

Yussof et al., "Sensorization of Robotic Hand Using Optical Three-Axis Tactile Sensor: Evaluation With Grasping and Twisting Motions", Journal of Computer Science, vol. 6, No. 8, Aug. 2010, pp. 955-962.

U.S. Appl. No. 17/900,843, "Final Office Action", Feb. 27, 2025, 26 pages.

* cited by examiner

ROBOTIC MANIPULATOR WITH CAMERA AND TACTILE SENSING

CROSS-REFERENCES TO RELATED APPLICATIONS

This application claims the benefit of U.S. Provisional Application No. 63/241,212 filed Sep. 7, 2021, the entire contents of which are hereby incorporated for all purposes in their entirety.

BACKGROUND OF THE INVENTION

Robotic grippers play an important role in the modern manufacturing industry. Gripper and finger designs, sensing capability and corresponding technological developments have recently been the focus of many researchers and commercial companies over the globe to meet up the demands of factory automation towards Industry 4.0.

Slippage detection, contact force estimation and grasp control are features of robotic grippers and tactile sensing that allow robotic grippers to achieve robust grasping and successful object manipulation. Several types of tactile sensors and methods have been addressed and integrated with robotic fingers to avail such features. Neuromorphic sensors have been used due to the increased expectation of robots on high precision requirements of tasks, timely detection of transient changes in dynamic scenes, and efficient acquisition and processing of sensory information enabling real-time response.

Neuromorphic vision-based tactile sensing holds promises to high precision robotic manipulation task requirements in industrial manufacturing and household services. However, such event-based cameras are not available in miniature size at present. In existing systems, vision sensors can be placed within the gripper's fingers or jaws to clearly capture the tactile or visual activity at the fingertips. However, such a camera placement can cause problems related to the safety and performance of the system. For example, the camera wiring and structure can restrict the movement of the gripper, the gripper operation can affect the camera performance (e.g., due to vibration from the gripper that is translated to the camera), or the camera can be damaged by the gripper's movement (e.g., the camera can be damaged if the gripper collides with an object).

A finger design that suits grippers for operations while achieving effective sensing is needed. Apart from that, the fingertip as an interface can play a crucial role in tactile sensing as well as in handling a wide variety of targets/objects. Thus, a novel robotic finger that serves multiple purposes, enhances tactile sensing capability, and offers a modular approach to replace fingertips to handle a wide category of objects/targets is an attractive option in robotic grippers and very much needed in industrial applications.

Soft robotic grippers have gained traction over the last few years owing to recent breakthroughs in multiple science and engineering disciplines. Unlike conventional grippers that are composed of rigid links and joints, soft grippers utilize flexible and compliant materials, making them a better candidate in unstructured environments and in handling delicate and fragile objects as compared to rigid grippers. The compliance and conformity of soft grippers allow them to envelope objects of different sizes and shapes while holding them, offering considerable advantage over conventional grippers in various applications.

Soft robots should obtain constantly updated information about their internal state (proprioception) and external tactile sensing (exteroception) to achieve robust grasping and fine manipulation. However, the increased degrees of freedom (DOF) and the limited range of sensors that can be used with them present significant challenges that hinder their perception abilities and limit their applications. Vision-based sensing is an active research area that investigates whether a camera-based sensor can be utilized to acquire information about the gripper and its surroundings. Such sensors present a potential solution that can provide adequate proprioceptive and exteroceptive information for soft robotic grippers and improve their grasping and manipulation abilities.

Recently, event-based camera technology has emerged with its potential to revolutionize robotic vision. Unlike frame-based traditional cameras, event-based cameras detect transient changes in dynamic scenes in terms of brightness intensity. Moreover, event-based cameras have a higher temporal resolution, lower latency, efficient data processing capability and consume less power as compared to frame-based cameras. While performing manipulation tasks, timely detection of proprioceptive and exteroceptive features is crucial for robotic grippers/hands to effectively regulate the grip force and maintain a stable grasp. Therefore, a novel robotic gripping system that incorporates a soft compliant finger and a neuromorphic event-based camera sensor to refine grasping capabilities and observe proprioceptive and exteroceptive information such that the robot is superiorly able to handle different types of objects is an attractive option that is needed in various applications.

Recent developments in robotic technologies have made them a competitive choice in a variety of industrial processes. Among other applications, precise robotic machining has been studied extensively by academics and practitioners since robots offer significant advantages over CNC machines in terms of flexibility, mobility, cost efficiency, and workspace volumes. However, the relatively low stiffness of robotic manipulators and the unstructured environment degrades the reliability and repeatability of robotic operation under contact forces and torques; and hence is a limiting factor in precise machining processes. As such, high-precision robotic machining remains an open area for research and development.

A well-known approach to resolve repeatability and precision challenges in robotic operation is to provide a closed-loop control mechanism that actuates the system based on sensory feedback and perception algorithms. For machining purposes, these perception systems must convey accurate estimates on the position and orientation of the robot's machining tool along with contact forces and torques. Existing technologies for robotic machining separate the perception process into two sensory sub-systems; the first focuses on initial positioning of the machining tool via metrology (laser trackers, cameras, . . . ) while the second monitors contact forces and torques using a formation of tactile sensors (strain gauge, piezoelectric, . . . ). While such configurations can provide ample performance, the requirement of two sensory sub-systems on the same machining tool significantly increases development cost and raises several issues of installation complexity, maintenance, power consumption, sensor synchronization, and data communication.

[1] G. Aceto, V. Persico, and A. Pescap'e, "A survey on information and communication technologies for industry 4.0: State-of-the-art, taxonomies, perspectives, and challenges," IEEE Communications Surveys & Tutorials, vol. 21, no. 4, pp. 3467-3501, 2019.

[2] P. De La Puente, D. Fischinger, M. Bajones, D. Wolf, and M. Vincze, "Grasping objects from the floor in assistive robotics: Real world implications and lessons learned," IEEE Access, vol. 7, pp. 123725-123735, 2019.

[3] Yole Dveloppement, "Neuromorphic sensing and computing," 2019, [Online; 2019]. [Online]. Available: https://yole-i-micronews-com.osu.eu-west-2.outscale.com/uploads/2019/09/YD19039 Neuromorphic Sensing Computing 2019 sample.pdf

[4] A. Vanarse, A. Osseiran, and A. Rassau, "A review of current neuromorphic approaches for vision, auditory, and olfactory sensors," Frontiers in neuroscience, vol. 10, p. 115, 2016.

[5] S.-C. Liu and T. Delbruck, "Neuromorphic sensory systems," Current opinion in neurobiology, vol. 20, no. 3, pp. 288-295, 2010.

[6] G. Indiveri and R. Douglas, "Neuromorphic vision sensors," Science, vol. 288, no. 5469, pp. 1189-1190, 2000.

[7] W. Chen, H. Khamis, I. Birznieks, N. F. Lepora, and S. J. Redmond, "Tactile sensors for friction estimation and incipient slip detection toward dexterous robotic manipulation: A review," IEEE Sensors Journal, vol. 18, no. 22, pp. 9049-9064, 2018

[8] A. B. Vallbo, R. S. Johansson et al., "Properties of cutaneous mechanoreceptors in the human hand related to touch sensation," Hum Neurobiol, vol. 3, no. 1, pp. 3-14, 1984.

[9] J. M. Romano, K. Hsiao, G. Niemeyer, S. Chitta, and K. J. Kuchenbecker, "Human-inspired robotic grasp control with tactile sensing," IEEE Transactions on Robotics, vol. 27, no. 6, pp. 1067-1079, 2011.

[10] A. Nakagawa-Silva, N. V. Thakor, J.-J. Cabibihan, and A. B. Soares, "A bio-inspired slip detection and reflex-like suppression method for robotic manipulators," IEEE Sensors Journal, vol. 19, no. 24, pp. 12443-12453, 2019.

[11] R. Jung, Biohybrid systems: nerves, interfaces and machines. John Wiley & Sons, 2011.

[12] P. Lichtsteiner, C. Posch, and T. Delbruck, "Latency asynchronous temporal contrast vision sensor," IEEE journal of solid-state circuits, vol. 43, no. 2, pp. 566-576, 2008

[13] W. Chen, H. Khamis, I. Birznieks, N. F. Lepora, and S. J. Redmond, "Tactile sensors for friction estimation and incipient slip detection toward dexterous robotic manipulation: A review," IEEE Sensors Journal, vol. 18, no. 22, pp. 9049-9064, 2018.

[14] H. Yussof, J. Wada, and M. Ohka, "Sensorization of robotic hand using optical three-axis tactile sensor: Evaluation with grasping and twisting motions," Journal of Computer Science, 2010.

[15] Y. Ito, Y. Kim, C. Nagai, and G. Obinata, "Shape sensing by vision based tactile sensor for dexterous handling of robot hands," in 2010 IEEE International Conference on Automation Science and Engineering. IEEE, 2010, pp. 574-579.

[16] T. Assaf, C. Roke, J. Rossiter, T. Pipe, and C. Melhuish, "Seeing by touch: Evaluation of a soft biologically-inspired artificial fingertip in real-time active touch," Sensors, vol. 14, no. 2, pp. 2561-2577, 2014.

[17] D. Hristu, N. Ferrier, and R. W. Brockett, "The performance of a deformable-membrane tactile sensor: basic results on geometrically defined tasks," in Proceedings 2000 ICRA. Millennium Conference IEEE International Conference on Robotics and Automation. Symposia Proceedings (Cat. No. 00CH37065), vol. 1. IEEE, 2000, pp. 508-513.

[18] R. Li, R. Platt, W. Yuan, A. ten Pas, N. Roscup, M. A. Srinivasan, and E. Adelson, "Localization and manipulation of small parts using gelsight tactile sensing," in 2014 IEEE/RSJ International Conference on Intelligent Robots and Systems. IEEE, 2014, pp. 3988-3993.

[19] Trueeb, Camill, Carmelo Sferrazza, and Raffaello D'Andrea. "Towards vision-based robotic skins: a data-driven, multi-camera tactile sensor." Institute for Dynamic Systems and Control, arXiv preprint arXiv: 1910.14526 (2019).

[20] A. Yamaguchi and C. G. Atkeson, "Grasp adaptation control with finger vision: Verification with deformable and fragile objects," in the 35th Annual Conference of the Robotics Society of Japan (RSJ2017), pp. 1L3-01, 2017.

[21] YAMAGUCHI et al., "Combining finger vision and optical tactile sensing: Reducing and handling errors while cutting vegetables," in 2016 IEEE-RAS 16th International Conference on Humanoid Robots (Humanoids). IEEE, 2016, pp. 1045-1051.

[22] A. Rigi, F. Baghaei Naeini, D. Makris, and Y. Zweiri, "A novel event-based incipient slip detection using dynamic active-pixel vision sensor (davis)," Sensors, vol. 18, no. 2, p. 333, 2018.

[23] F. Baghaei Naeini et al., "A Novel Dynamic-Vision-Based Approach for Tactile Sensing Applications," in *IEEE Transactions on Instrumentation and Measurement*, vol. 69, no. 5, pp. 1881-1893, May 2020, doi: 10.1109/TIM.2019.2919354.

[24] B. Ward-Cherrier, N. Pestell and N. F. Lepora, "NeuroTac: A Neuromorphic Optical Tactile Sensor applied to Texture Recognition," 2020 *IEEE International Conference on Robotics and Automation (ICRA)*, 2020, pp. 2654-2660, doi: 10.1109/ICRA40945.2020.9197046.

[25] R. Muthusamy, X. Huang, Y. Zweiri, L. Seneviratne and D. Gan, "Neuromorphic Event-Based Slip Detection and Suppression in Robotic Grasping and Manipulation," in *IEEE Access*, vol. 8, pp. 153364-153384, 2020, doi: 10.1109/ACCESS.2020.3017738.

[26] R. Muthusamy et al., "Neuromorphic Eye-in-Hand Visual Servoing," in IEEE Access, vol. 9, pp. 55853-55870, 2021, doi: 10.1109/ACCESS.2021.3071261.

[27] J. Hughes, U. Culha, F. Giardina, F. Guenther, A. Rosendo, and F. Iida, "Soft manipulators and grippers: A review," Front. Robot. AI, vol. 3, no. November, 2016.

[28] M. I. Tiwana, S. J. Redmond, and N. H. Lovell, "A review of tactile sensing technologies with applications in biomedical engineering," *Sensors Actuators, A Phys.*, vol. 179, pp. 17-31, 2012.

[29] C. Chorley, C. Melhuish, T. Pipe, and J. Rossiter, "Development of a tactile sensor based on biologically inspired edge encoding," in 2009 *International Conference on Advanced Robotics*. IEEE, 2009, pp. 1-6.

[30] M. K. Johnson and E. H. Adelson, "Retrographic sensing for the measurement of surface texture and shape," in 2009 *IEEE Conference on Computer Vision and Pattern Recognition*. IEEE, 2009, pp. 1070-1077.

[31] A. C. Abad and A. Ranasinghe, "Visuotactile sensors with emphasis on gelsight sensor: A review," *IEEE Sensors Journal*, vol. 20, no. 14, pp. 7628-7638, 2020.

[32] B. Ward-Cherrier, N. Pestell, L. Cramphorn, B. Winstone, M. E. Giannaccini, J. Rossiter, and N. F. Lepora, "The tactip family: Soft optical tactile sensors with 3d-printed biomimetic morphologies," *Soft robotics*, vol. 5, no. 2, pp. 216-227, 2018.

[33] R. Wang, S. Wang, S. Du, E. Xiao, W. Yuan, and C. Feng, "Real-time Soft Body 3D Proprioception via Deep Vision-based Sensing," April 2019.

[34] Y. She, S. Q. Liu, P. Yu, and E. Adelson, "Exoskeleton-covered soft finger with vision-based proprioception and tactile sensing," October 2019.

[33] K. Kumagai and K. Shimonomura, "Event-based Tactile Image Sensor for Detecting Spatio-Temporal Fast Phenomena in Contacts," in 2019 *IEEE World Haptics Conference, WHC* 2019, 2019, pp. 343-348.

[36] B. Ward-Cherrier, J. Conradt, M. G. Catalano, M. Bianchi, and N. F. Lepora, "A miniaturised neuromorphic tactile sensor integrated with an anthropomorphic robot hand," in 2020 *IEEE/RSJ International Conference on Intelligent Robots and Systems (IROS)*. IEEE, 2020, pp. 9883-9889.

[37] W. Ji and L. Wang, "Industrial robotic machining: a review," *Int. J. Adv. Manuf. Technol.*, vol. 103, no. 1-4, pp. 1239-1255, 2019, doi: 10.1007/s00170-019-03403-z.

[38] A. Karim and A. Verl, "Challenges and obstacles in robot-machining," in 2013 *44th International Symposium on Robotics, ISR* 2013, 2013, doi: 10.1109/ISR.2013.6695731.

[39] T. Olsson et al., "Cost-efficient drilling using industrial robots with high-bandwidth force feedback," *Robot. Comput. Integr. Manuf.*, vol. 26, no. 1, pp. 24-38, 2010, doi: 10.1016/j.rcim.2009.01.002.

[40] T. Al Khawli, H. Bendemra, M. Anwar, D. Swart, and J. Dias, "Introducing data analytics to the robotic drilling process," *Ind. Rob.*, 2018, doi: 10.1108/IR-01-2018-0018.

[41] A. Frommknecht, J. Kuehnle, I. Effenberger, and S. Pidan, "Multi-sensor measurement system for robotic drilling," *Robot. Comput. Integr. Manuf.*, vol. 47, no. December 2015, pp. 4-10, 2017, doi: 10.1016/j.rcim.2017.01.002.

[42] H. Alzarok, S. Fletcher, and A. P. Longstaff, "3D visual tracking of an articulated robot in precision automated tasks," *Sensors (Switzerland)*, 2017, doi: 10.3390/s17010104.

[43] P. Xu, G. Xu, X. Tang, and S. Yao, "A visual seam tracking system for robotic arc welding," *Int. J. Adv. Manuf. Technol.*, 2008, doi: 10.1007/s00170-007-0939-6.

[44] D. G. G. Rosa, J. F. S. Feiteira, A. M. Lopes, and P. A. F. de Abreu, "Analysis and implementation of a force control strategy for drilling operations with an industrial robot," *J. Brazilian Soc. Mech. Sci. Eng.*, vol. 39, no. 11, pp. 4749-4756, 2017, doi: 10.1007/s40430-017-0913-7.

[45] W. J. Cantwell and J. Morton, "The impact resistance of composite materials—a review," Composites, 1991, doi: 10.1016/0010-4361(91)90549-V.

[46] F. Domroes, C. Krewet, and B. Kuhlenkoetter, "Application and Analysis of Force Control Strategies to Deburring and Grinding," *Mod. Mech. Eng.*, 2013, doi: 10.4236/mme.2013.32a002.

[47] F. Chen, H. Zhao, D. Li, L. Chen, C. Tan, and H. Ding, "Robotic grinding of a blisk with two degrees of freedom contact force control," *Int. J. Adv. Manuf. Technol.*, 2019, doi: 10.1007/s00170-018-2925-6.

[48] Y. Ding, X. Min, W. Fu, and Z. Liang, "Research and application on force control of industrial robot polishing concave curved surfaces," *Proc. Inst. Mech. Eng. Part BJ. Eng. Manuf.*, 2019, doi: 10.1177/0954405418802309.

[49] Y. Xie, W. Zou, Y. Yang, and J. Lia, "Design of robotic end-effector for milling force control," in *IOP Conference Series Materials Science and Engineering*, 2018.

[50] "Application Manual—ABB," 2018. [Online]. Available: https://abb.sluzba.cz/Pages/Public/IRC5UserDocumentationRW6/en/3HAC050377 AM Force control RW 6-en.pdf.

[51] A. Caggiano, F. Napolitano, L. Nele, and R. Teti, "Study on thrust force and torque sensor signals in drilling of Al/CFRP stacks for aeronautical applications," *Procedia CIRP*, vol. 79, pp. 337-342, 2019, doi: 10.1016/j.procir.2019.02.079.

[52] "Multi-Axis Force/Torque Sensor," 2014. [Online]. Available: https://www.ati-ia.com/Library/documents/ATI_FT_Catalog.pdf.

[53] "Force/Torque Sensors." https://www.jr3.com/products/force-torque-sensors (accessed Nov. 7, 2020).

[54] "Force sensors," 2019. [Online]. Available: https://www.kistler.com/files/download/960-262e_ST.pdf?callee=frontend.

[55] L. Sun, F. Liang, and L. Fang, "Design and performance analysis of an industrial robot arm for robotic drilling process," *Ind. Rob.*, vol. 46, no. 1, pp. 7-16, 2019, doi: 10.1108/IR-06-2018-0124.

[58] R. Devlieg, "High-Accuracy Robotic Drilling/Milling of 737 Inboard Flaps," *SAE Int. J. Aerosp.*, vol. 4, no. 2, pp. 1373-1379, 2011, doi: 10.4271/2011-01-2733.

[57] W. Yuan, S. Dong, and E. H. Adelson, "GelSight: High-resolution robot tactile sensors for estimating geometry and force," *Sensors (Switzerland)*, vol. 17, no. 12, 2017, doi: 10.3390/s17122762.

[58] C. Trueeb, C. Sferrazza, and R. D'Andrea, "Towards vision-based robotic skins: a data-driven, multi-camera tactile sensor," pp. 333-338, 2020, doi: 10.1109/robosoft48309.2020.9116060.

[59] W. Yuan, C. Zhu, A. Owens, M. A. Srinivasan, and E. H. Adelson, "Shape-independent hardness estimation using deep learning and a GelSight tactile sensor," *Proc.—IEEE Int. Conf. Robot. Autom.*, pp. 951-958, 2017, doi: 10.1109/ICRA.2017.7989116.

[60] P. Lichtsteiner, C. Posch, and T. Delbruck, "A 128×128 120 dB 15 μs latency asynchronous temporal contrast vision sensor," *IEEE J. Solid-State Circuits*, 2008, doi: 10.1109/JSSC.2007.914337.

[61] "Performance, Prophesee and Sony Develop a Stacked Event-Based Vision Sensor with the Industry's Smallest Pixels and Highest HDR," 2020. https://www.prophesee.ai/2020/02/19/prophesee-sony-stacked-event-based-vision-sensor/.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
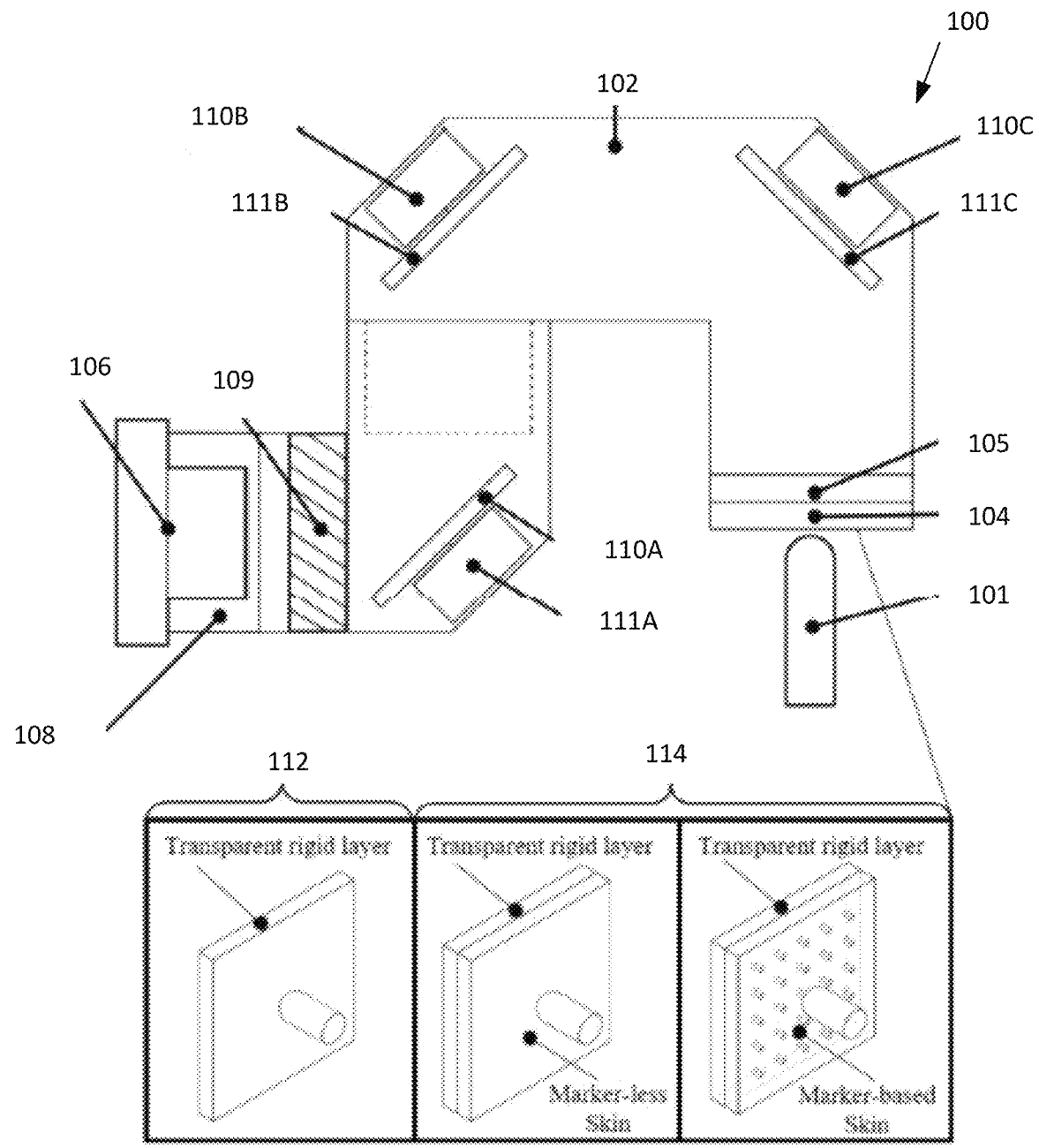
FIG. 1 is a schematic view of an example robotic manipulator including multiple tactile interfaces, in accordance with various embodiments.

Embodiments and techniques described herein are directed to robotic manipulators with end effectors. The end-effector can be or include a gripper, multi-figured hand, or a tool that includes actuators, sensors and/or capabilities such as vision-based tactile sensing and visual guidance using (frame-based and event-based vision technologies).

With the emergence of Industry 4.0 [1] and increased use of service robots in several application domains [2], there is a growing demand for enhanced sensing and control capabilities in robotic gripper systems to handle a variety of targets and tackle the uncertainties occurring during physical tasks. Neuromorphic vision sensors detect transient changes in dynamic scenes asynchronously at a pixel-level with a high temporal resolution, low latency and wide dynamic range. Such event-based sensors are a potential alternative to conventional tactile sensors. A recent technology and market report [3] predicts that the neuromorphic sensing [4], [5], [6] and computing technologies will make a great impact on automotive, mobile, medical, industrial, and consumer sectors from 2024.

Sense of touch [7] and vision are the most important sensory modalities that allow humans to maintain a controlled grip. Neuromorphic sensors offer a viable solution to emulate the processing of sensor signals from such biological modalities. The human hand is the most specialized part of the body that provides accurate tactile feedback [8]. Detection of incipient slip is one key function of the tactile sensing modalities which enables human to perform robust grasping and dexterous manipulation. During the tactile activity, signal patterns from different receptors are diverse for different tasks and their combination increases the level of pattern complexity. Difficulties in obtaining a clear model for such a complex biological system is one of the primary reasons for the limited progress in artificial tactile sensing and development of the neuromorphic tactile sensor. Alternatively, the neuromorphic approach is used to transform tactile signals to biological relevant representation (spike events). Recently, drawing inspiration from the behavior of mechanoreceptors in the human hand, [9] demonstrated the feasibility of a tactile-event driven model for grasp control and [10] developed a slip detection and suppression strategy for robotic hands.

Vision is one of the most important sensing modalities heavily used by humans for perception. In fact, the retina is the extensively studied human neuro-biological system which remains a prominent example for the model, design, and implementation of neuromorphic sensors [11]. Conventional frame-based image sensors are focused on implementing the 'what' system by which they neglect the dynamic information in the visual scene. Recently, Dynamic vision sensor (DVS) [12] was mainly developed to realize the 'where' system. The DVS sensor constitutes a simplified three-layer model of the human retina that operates in continuous time by responding to brightness changes in the scene. Each individual pixel in the sensor array works autonomously and responds to temporal contrast by generating asynchronous spiked events. Our invention utilizes such a sensor for tactile sensing to enhance sensitivity and handle a wide class of targets/objects.

Tactile sensing still remains a key element in robotic grasping and manipulation. Robotic grippers and hands are increasingly equipped with different types of tactile sensors. Based on the working principles, tactile sensing is mainly achieved by detecting object motions directly or indirectly [13]. The idea of using frame-based image sensors for tactile sensing is not new that allows detecting of object motion. Detecting the internal reflections via optic-based [14] and marker-based vision sensing, where markers are placed on the skin surface and their displacements are measured using image processing techniques [15], [16], [17] and registration of objects through marker-less localization is achieved [18]. In [19], the authors used regular frame-based camera to track the markers on the inner surface of a soft fingertip in order to provide information about the contact force distribution while deformation occurred. In most of the works, vision sensors are placed underneath the skin surface to detect the motion of markers which somehow limits the ability of the vision sensor in distinguishing whether the change of contacts is from grasped object or external disturbances. More recently, Yamaguchi et al. [20] proposed a vision (frame-based) based tactile sensor [21] to detect slip and proposed a grasp adaptation controller that modifies the grasp to avoid slip.

Only a few recent works addressed dynamic vision sensing in robotic grasping. In [22], an event-based frame approach to detect incipient slip between a 10 ms to 44.1 ms sampling rate was presented. At the contact level, silicon material was used and the event distribution was analyzed on the reconstructed frames for slip detection.

In [23], machine learning methods were used to estimate contact force and classify materials for a grasp. The authors in [24] presented a NeuroTac sensor and corresponding encoding methods for texture classification tasks. Recently, Muthusamy et al. [25] demonstrated successful control of the grasping force using slip detection data from an event-based camera. The authors were able to achieve a sampling rate as low as 500 µs and they designed a Mamdani-type fuzzy logic controlling algorithm to adjust the applied force and suppress the slip once it is detected. In another work, Muthusamy et al. [26] used an event-based camera with eye-in-hand configuration to detect, extract, and track high-level features of a target object. The researchers developed an algorithm to control the gripper motion and align it accurately with the target object based on these features such that the gripper is situated in the correct position to begin the grasping process.

Unlike the traditional robotic grippers, soft grippers [27] have recently shown numerous advantages and needs for the twenty-first century. Qualities such as compliance, adaptability, and softness in physical interactions enable soft grippers to handle a variety of fragile and delicate objects and fulfil the application needs in human-centered and industrial environments. However, utilizing such qualities and unlocking their potential face several difficulties including challenging perception and sensing. Therefore, it is inevitable that researchers have to address these challenges to achieve robust performance of soft robots.

Humans show impressive capabilities of grasping unknown objects and performing dexterous tasks in unstructured environments [28]. When handling an object, we acquire information about it using receptors and senses which enable us to apply the right amount of force to keep the object intact even when we do not know its physical properties. Researchers have been striving to develop robotic grippers that mimic human grasping by improving the proprioceptive and exteroceptive tactile sensing and perception capabilities. Several studies have explored utilizing vision-based sensors for tackling perception and sensing challenges of soft robots. Success stories of frame based tactile sensors, such as TacTip [29] and GelSight [30], have been developed and employed to sense tactile data from soft skins and fingertips [31], [32]. Wang et al. [33] demonstrated the use of vision-based sensors for real-time shape reconstruction and proprioception of soft bodies in 3D. The authors successfully used images of painted patterns from cameras inside the object as an input for a neural network-based algorithm to predict the deformed shapes and obtained the proprioception of the body. In another work, She et al. [34] designed a novel soft finger with embedded cameras for simultaneous proprioception and exteroception. The sensors captured images of dot features and a painted layer that were placed inside the finger. By processing the images through a convolutional neural network, the researchers were able to achieve highly accurate proprioception prediction of the finger and classify the sizes and shapes of the grasped objects from exteroceptive tactile information. Nonetheless, conventional frame-based cameras used in these success stories place considerable limitations that can be avoided with the use of event-based cameras.

Various research works have employed event-based cameras to obtain exteroceptive tactile information: Kumagai and Shimonomura [35] utilized an event-based camera with a pixel resolution of 128×128 and a temporal resolution of 500 µs to obtain tactile information from a fingertip that contained 361 marker dots. The camera was capable of detecting the fast contact of an object with the fingertip, the contact position, the object orientation, and the fast changes in slip by analysing the intensity changes in the marker dots. Neuromorphic vision-based sensor has been used to extract tactile information from soft skins [24] and fingertips [36].

The automation of high-precision industrial operations like drilling have generally been dependent on CNC machine tools for their high accuracy and stability. However, the recent breakthroughs in robotic platforms have made them an attractive alternative due to their cost efficiency and flexibility [37], [38]. High-precision machining with robotic platforms has been a rich field of research in academia and the industry to overcome the challenges posed by the relatively low-stiffness of robots [38]. A crucial element in attaining this precision is obtaining high-quality sensor-based information during the machining process to be utilized in intelligent decision-making and control systems [37].

Sensory systems for robotic machining need to convey information on the position and orientation of the machining tool as well as tactile feedback on contact forces and torques [39]. The former type of data is often inferred from well-established metrology systems such as cameras and laser trackers; and the associated algorithms are mature and well-studied [40]-[43]. Tactile information such as contact forces are also crucial for the success of precise and sensitive machining operations to guarantee repeatability and avoid damaging delicate workpieces [44]-[45]. Force Feedback controllers have been studied extensively in the literature for precise robotic manipulation and machining and showed significant advantages in performance [46]-[49]. ABB introduced its suite of force-based controllers in the last decade and has been widely adopted for precise machining objectives [50]. Contact force data also plays an important role in evaluating the success of drilling operations along with identifying hazardous or abnormal conditions [51]. Tactile information (i.e., contact forces and torques) are often inferred using an array of strain gauge or piezoelectric sensors installed on the robot's end effector. In [41], an ATI's D330-30 strain gauge-based sensor [52] installed between the manipulator's end effector and a spindle was utilized in a feedback controller to improve the quality of drilling processes and reduce sliding movements. Similarly, [39] utilized a JR3 160/50M force sensor [53] to estimate and control forces in 3D for more precise robotic drilling. Kirstler 9257A piezoelectric sensors [54] were utilized in [51] for monitoring forces and torques during the drilling process for performance evaluation. A novel sensor consisting of two groups of dynamometers was developed in [55] for accurate estimation of axial forces on a drilling tool. All the aforementioned sensors provide ample accuracy and utilizing them in feedback algorithms has proven advantageous to the overall quality of machining. However, most of these sensors suffer from low-bandwidth and high latency. Additionally, in the absence of direct contact, these sensors do not provide any information on the external surroundings of the robot's end effector; as such, most practical configuration couples these sensors with other metrology systems for initial positioning and/or obstacle detection. For example, the design in [56] is closest in functionality to our proposed invention but requires two different sensors; the first of which is a force sensing load cell housed in the pressure foot to estimate contact forces and orientation, while the second sensor is an external camera utilized for global positioning of the machining tool. Such a requirement of two sensory systems boosts development cost and causes several complexities with installation, maintenance, power consumption, sensor synchronization, and data communication.

The proposed invention builds upon recent developments in optical tactile sensing to introduce a purely vision-based sensor for robotic machining. Vision-based tactile sensing has demonstrated advantages in cost, latency, and resolution over other alternatives [57]-[59]. In particular, neuromorphic cameras offer microsecond level latency, a high dynamic range up to 120 db, and a very low power consumption [25], [26], [60], making them a very attractive choice for precise machining applications. The proposed invention also makes use of the versatility of optical sensors to introduce a full solution for robotic machining where external surroundings can be observed in addition to the tactile information as presented in FIG. 10. The wide range of capabilities of the proposed sensor makes it sufficient for the full operation of a machining robot, which in turn reduces cost and alleviates power consumption and complexity concerns when compared to alternative solutions that require multiple sensory systems. Furthermore, the flexibility of visual sensors enables multiple design variants in terms of the numbers of contact points, camera placement, and sensor dimensions as showcased in FIGS. 2 and 3. Finally, the proposed sensor offers low-cost customization potential, as most components can be 3D-printed or casted to fit specific requirements. For instance, several low-cost tactile interfaces can be fabricated, which in turn offers an inexpensive trade-off between resolution and range for the contact force estimation problem. Similarly, the housing of the sensor can be 3D-printed at different dimensions according to application requirements. As major manufacturers are building smaller cameras [61], the proposed invention can be fabricated at very small sizes which widens its possible applications to areas such as small-scale electronics manufacturing and assembly, which are challenging applications for current force/torque sensors due to their relatively bulky size.

The current event-based sensors are not available in miniature size. Moreover, the placements of the event camera at the finger level reduces the workspace in manipulation operation and increases the possibility of hitting objects in the workspace. Thus, we developed a novel mirror optic system to engage neuromorphic tactile sensing with different fingertips suitable for a class of objects, customizing sensitivity and range.

This invention generally relates to robotic grippers and tactile sensing, particularly, to a robotic finger with a sense of touch that provides sensory feedback capability for robotic grippers to robustly grasp under uncertainties and handle a wide variety of objects with high precision for automation.

In this invention, a novel robotic finger is developed called NeuroVisioTac that can measure finger-tip tactile information with enhanced sensitivity and range, with an integrated event-based camera. In various embodiments, one or more optic lenses can be placed at any suitable point of the optical channel of the event-based camera. The position of the one or more optic lenses can be based, for example, on the gripper-operations and/or to fulfill the field of view requirements. In further embodiments, the robotic finger can include an illumination system that can provide customized lighting conditions for the optical sensing.

In the robotic finger systems described herein, fingers (e.g., fingers including finger-tip tactile material) can be used in combination with soft, hard and multiple fingers to suit different applications, to handle a variety of targets and to attain robust grasping and precise manipulation. In various embodiments, materials for use with the finger can be chosen based on, for example, the operation requirements and/or the categories of objects to be handled. The use of the novel robotic finger in systems allows for the system to be designed for camera integration, allows for a novel approach for modular finger-tip tactile interfaces, and allows for the use of methods for measuring event-based tactile information from different interfaces.

In embodiments described herein, (e.g., embodiments discussed in reference to FIGS. 1 and 6A) a novel way of sensorization of the finger considering real-time operations, grasping applications, and safety aspects in robotic grippers/hands is discussed.

In known robotic fingers [20-25], a vision sensor is placed simply at the backside of the gripper-fingertip or used with the standalone tactile sensing module to capture the tactile activity. Our customizable design structure (e.g., as shown in FIG. 1) engages optical channel/system within the finger embodiment, facilitates the use of multiple tactile interfaces at the fingertip, and overcomes the problems related to the safety and performance of the vision-based tactile sensing. In particular, the camera placement poses the following safety-, workspace-, and performance-related concerns: i) Camera wiring and structure that could possibly restrict the movement of the gripper-fingers; ii) vibrations transmitted from the fingers to the camera while performing gripper operation that could degrade the vision-based tactile sensing performance; and iii) the finger could possibly collide with an object during robot operations and cause damage to the camera. Overall, the finger design provides an optical path to the stationary camera to acquire the tactile activity during object handling. Such arrangements ensure camera-safety during gripper-operation in unstructured environments and provide more operational space to the gripper.

Figure 6A:
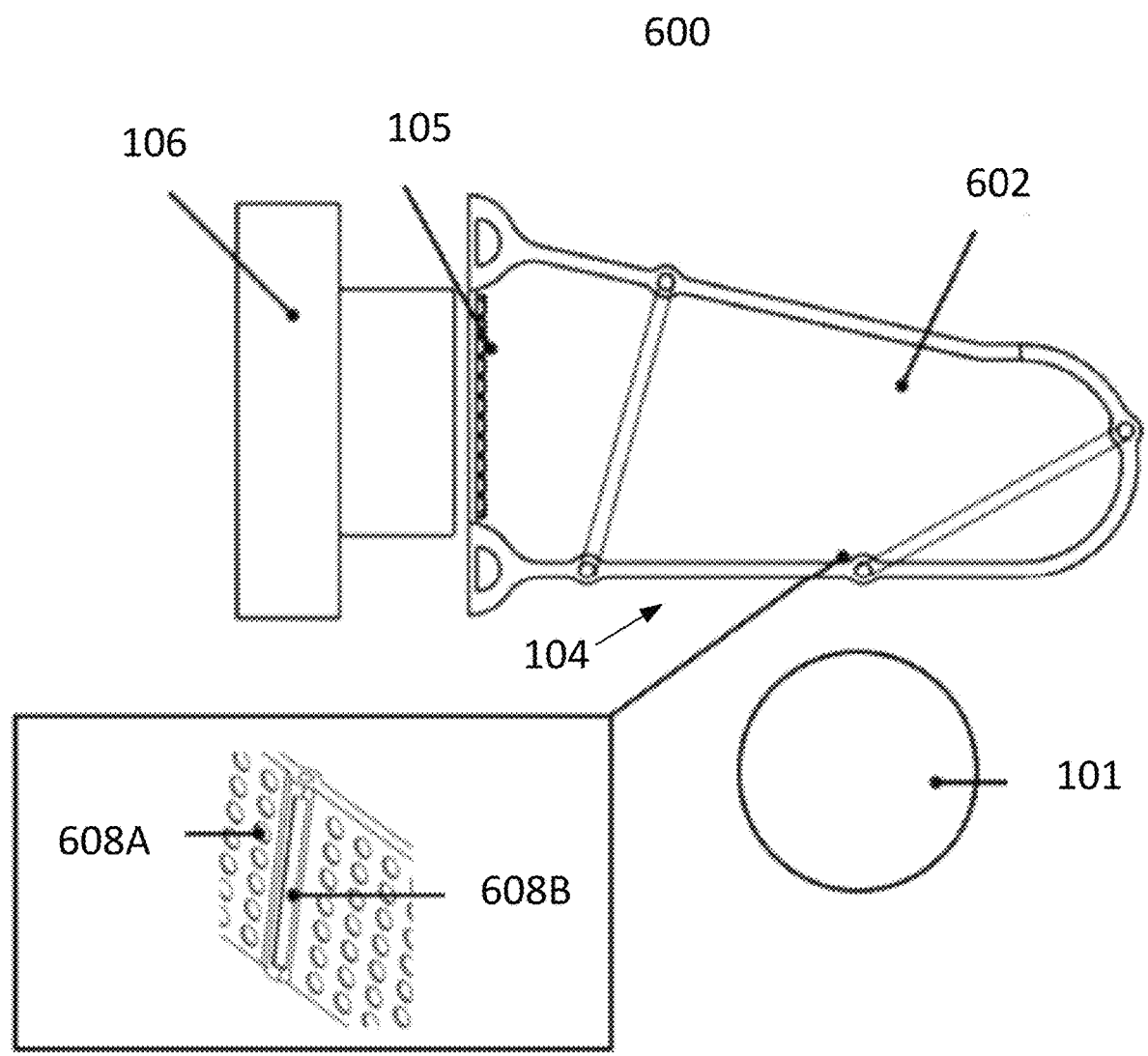
FIG. 6A shows an example end effector for use with a robotic manipulator, in accordance with various embodiments.
Figure 6B:
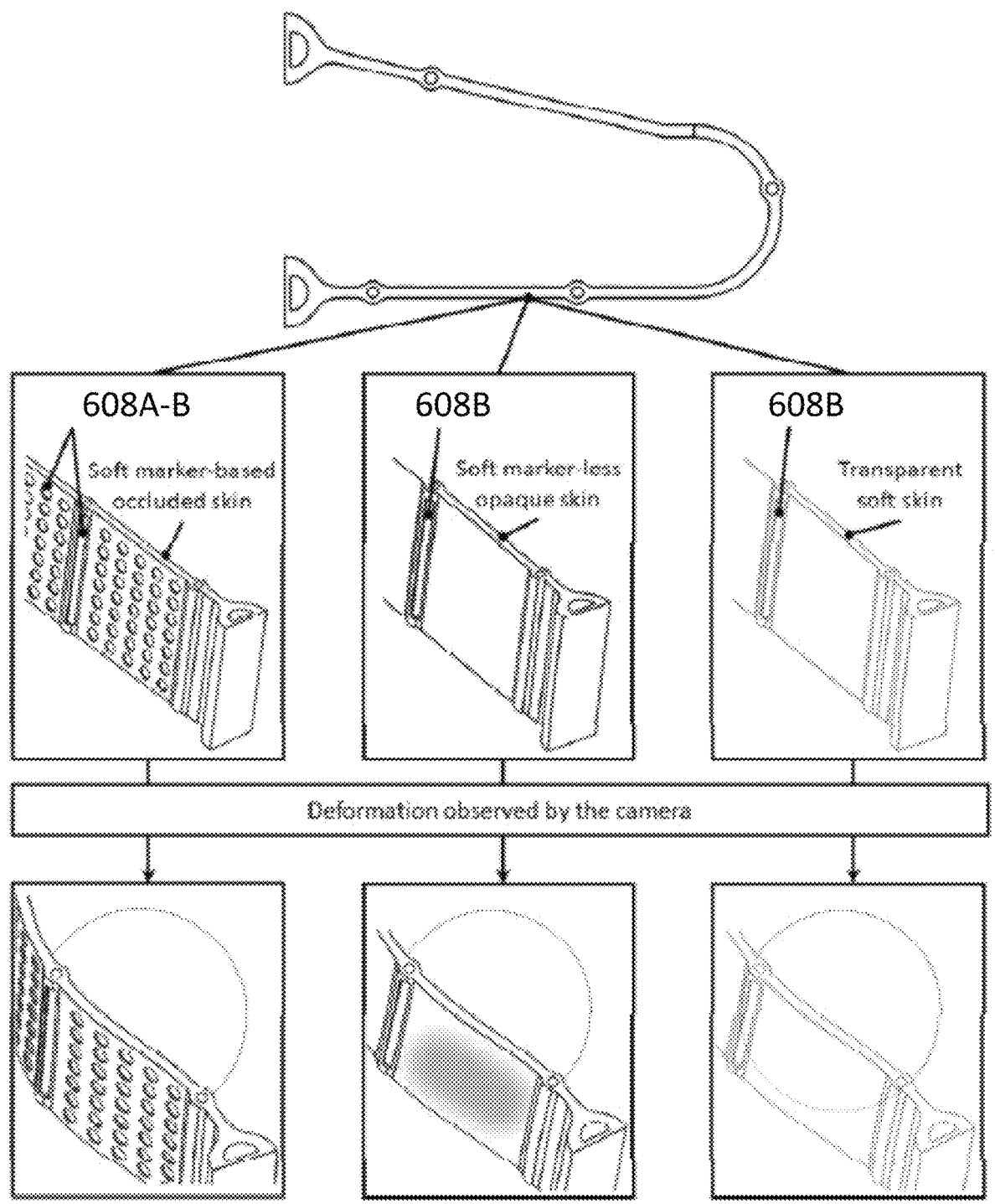
FIG. 6B shows example engagement surfaces for use with the end effector of FIG. 6A, in accordance with various embodiments.

The customizable finger-structure design (e.g., as shown in FIG. 6A) emphasizes the sensorization of a soft finger without negatively affecting the finger compliance and conformity. Additionally, the developed finger-structure facilitates the use of multiple tactile interfaces (e.g., as shown in FIG. 6B) to interact with objects/targets. Known gripping systems don't have or utilize a passive soft finger with neuromorphic vision-based sensing, different tactile interfaces, and skin- and joint-markers to superiorly extract proprioceptive and exteroceptive information. Employing such a finger in robotic grippers, for example the robotic grippers described herein, allows pinch and envelope grasp behaviors and at the same time ensure safe, adaptive, and precise handling of a wide variety of objects in both human-centered and unstructured environments.

FIG. 1 is a schematic view of an example robotic manipulator 100 including multiple tactile interfaces 104. The novel robotic finger (NeuroVisioTac) comprises an event camera 106, an optic mirror system 102, and a tactile interface. Event cameras 106 represent visual information in terms of time with respect to a spatial reference in the camera-pixel arrays. Pixels in the dynamic vision sensor 106 respond independently and asynchronously to logarithmic brightness changes in the scene. For a relative motion, a stream of events with a microsecond temporal resolution and latency is generated and such event representation is in the spatiotemporal form. The optic mirror system includes a camera base 108, lens 109 to bring light to a fixed focal point, and three mirrors 111A-C with different orientation placed 45 degrees with respect to the ray of light coming from the tactile interface 104. The LED ring gives sufficient illumination to the optic mirror system 102 such that the event camera 106 is able to observe the brightness changes caused by the relative motion of the object 101. The event camera 106 can be integrated with the optic mirror system and calibrated to receive the tactile information at the fingertip. The fingertip tactile interface 104 is a tool to interact with objects/targets and provide sensory feedback about the interaction. Neuro VisioTac 100 facilitates the mounting of different type of fingertips 104. We classify such tactile interfaces to hard and soft fingertips. The hard fingertip 112 can be a simple transparent rigid layer that offers cheap finger replacements, minimize wear and tear, and not be affected by the weight, material type and geometry of the object. Soft fingertip 114 refers to deforming skin (opaque skin) or specialized skin (occluding skin with embedded markers) which customizes sensitivity and range of objects 101. The soft fingertip 114 and hard fingertip 112 enables the finger to handle a wide class of objects 101 such as fragile, soft, light and heavyweight as well as delicate and deformable things like commercial food. The invention can also be customized based on the gripper actuation mechanism, operational environment, targets to be handled, available size of the camera 106 and requirements of tactile sensing. Both frame-based and event-based cameras 106 can be utilized for vision-based tactile sensing. However, the main purpose of the invention is to avail the neuromorphic sensing capability using the event camera.

Figure 2A:
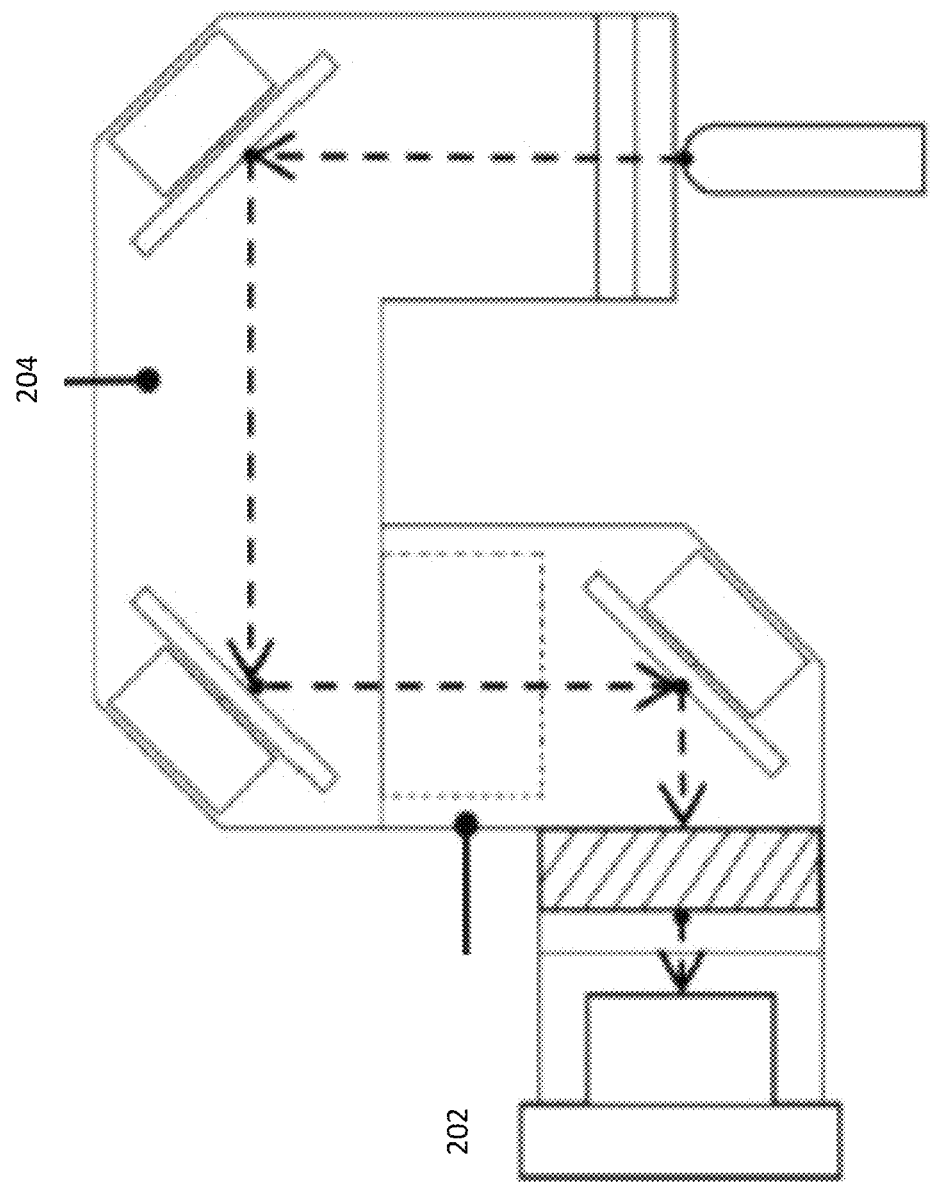
FIG. 2A shows the robotic manipulator of FIG. 1 in an open state, in accordance with various embodiments.
Figure 2B:
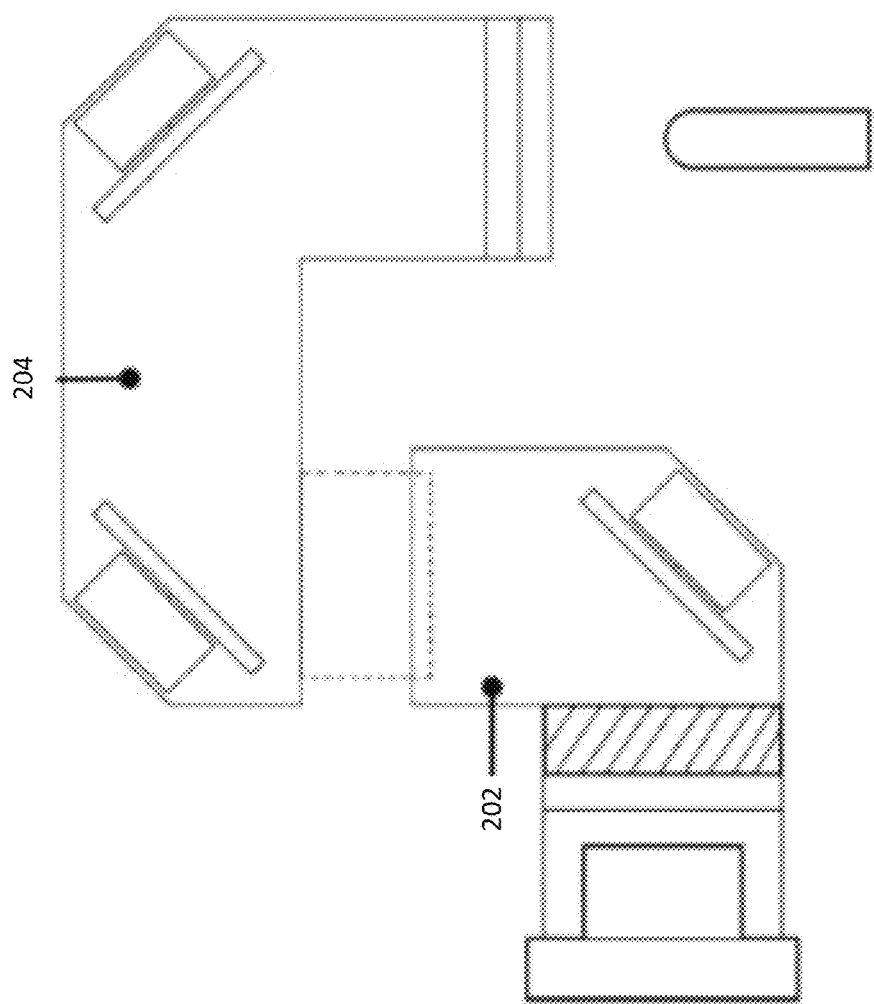
FIG. 2B shows the robotic manipulator of FIG. 2 in a closed state, in accordance with various embodiments.

Neuro VisioTac has a static and moving part arrangement to reduce the load on the actuation mechanism and to increase the operational workspace of the robot. The static part consists of an event camera 106, a lens 109, and a mirror 111 such that the ray of light passes conveniently without any dynamic motion of the camera 106. The rest of the optic mirror system 102 can move back and forth to support gripper states. FIG. 2A shows the robotic manipulator of FIG. 1 in an open state and FIG. 2B shows the robotic manipulator of FIG. 2 in a closed state. Moreover, the optic mirror system 102 that works based on laws of reflection of light upon object contact and the "close" state is illustrated in the left side of the schematic diagram.

Figure 3:
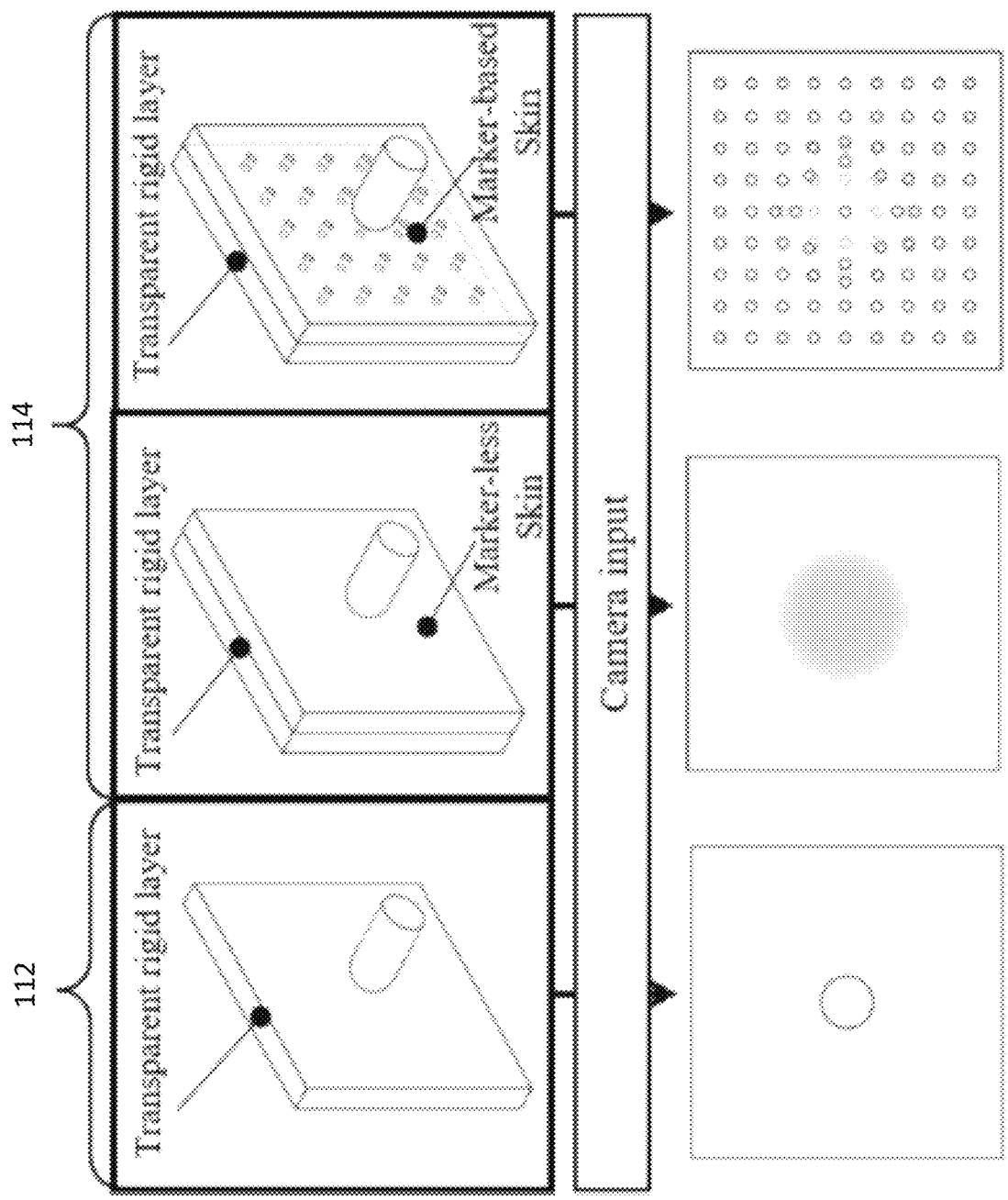
FIG. 3 shows example tactile interfaces with sensed tactile illustrations for use with the robotic manipulator of FIG. 1, in accordance with various embodiments.

Event cameras 106 detect illumination changes that are directly channeled through optic mirror system from the tactile interface 104. Detection of such transient changes at the tactile interface 104 is crucial to robotic grasping and manipulation applications. The methods to measure tactile information with an integrated event camera 106 varies, depending on the retrofitted fingertips. The hard fingertip 112 allows the event camera 106 to measure the object contour or pattern events directly when there is a relative object motion. The marker-less soft fingertip 114 measures events from skin deformation. The marker-based soft fingertip 114 provides a closed and controlled environment for tactile sensing and measures marker-based events. FIG. 3 shows the examples of tactile interfaces 104 for use with the robotic manipulator 100 of FIG. 1 including the external stimuli at different fingertips and the perceived tactile information by the event camera 106. The illustration shows the accumulated events in a frame, but individual events have their own timestamp in the spatial space.

Figure 4:
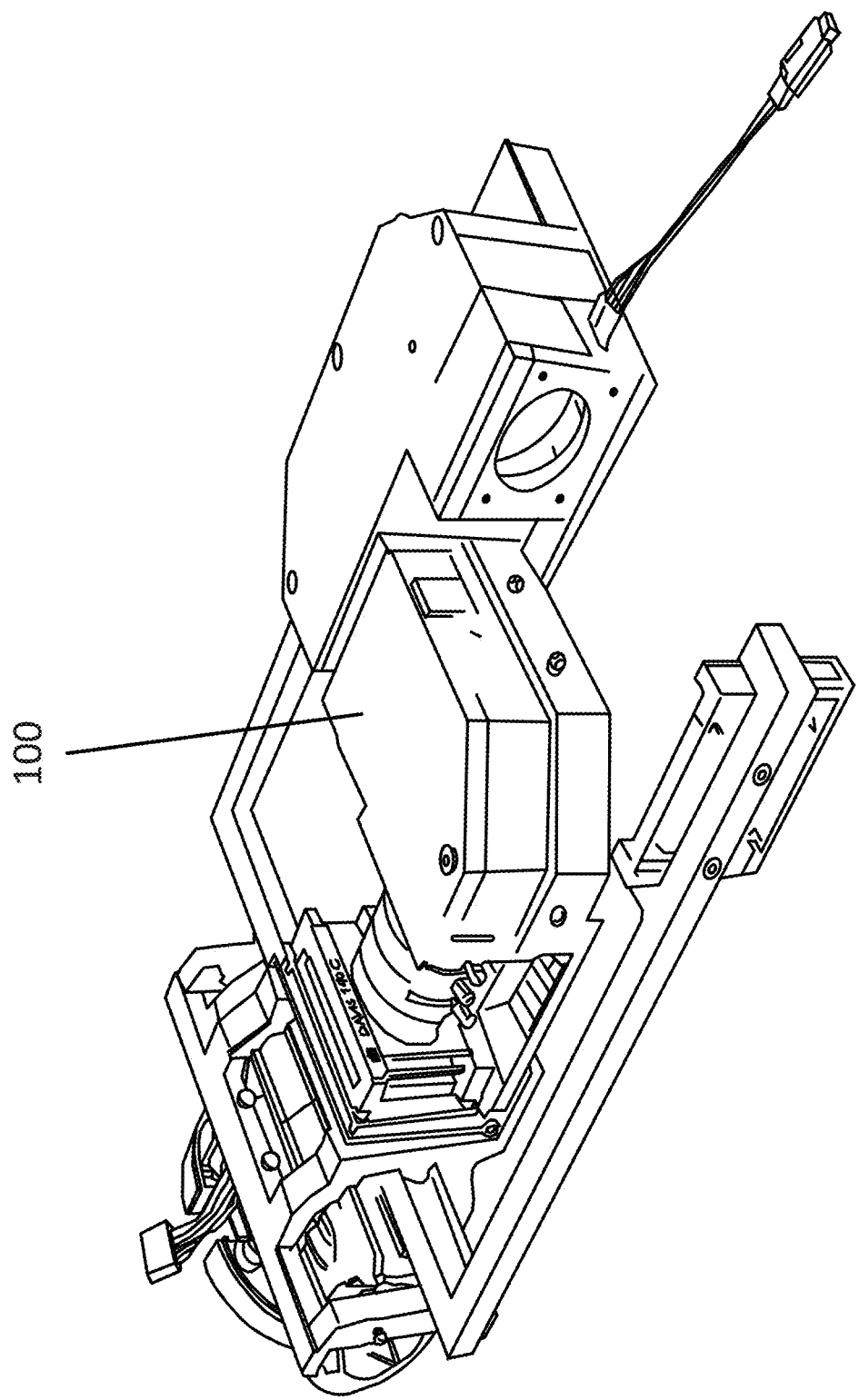
FIG. 4 shows an additional example robotic manipulator, in accordance with various embodiments.

FIG. 4 shows an additional example robotic manipulator. With the overwhelming capability and advantages of the invention, technological advancements towards slip detection, object pose estimation, force estimation, and grasp control will bring a paradigm shift in factory automation and collaborative robotics. To the best of our knowledge, none of the earlier robotic fingers neither use multi-mirror optic pathways nor facilitates to mount different types of fingertips that to integrate event camera for vision-based tactile sensing and to serve different targets.

Figure 5:
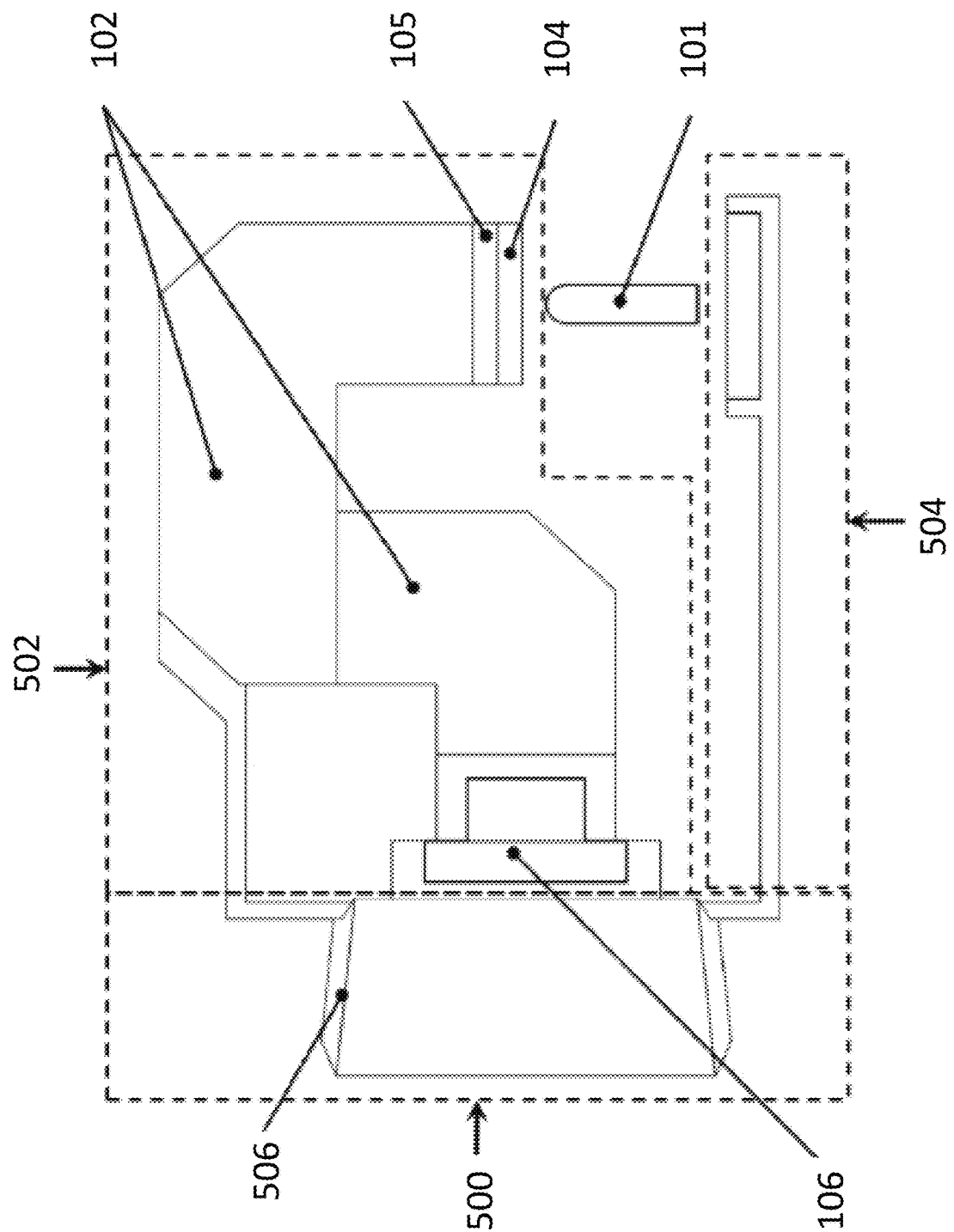
FIG. 5 shows a schematic view of the robotic manipulator of FIG. 4, in accordance with various embodiments.

FIG. 5 shows a schematic view of the robotic manipulator 100 of FIG. 4. It is a heterogeneous and modular system, which consists of actuation unit 500, vision-based tactile finger unit 502, and add-on finger unit 504. The actuation unit 500 enables the finger 502 to move in a parallel motion in relation to the gripper 100 body and facilitates the attachment of custom-made fingers. The tactile finger unit 502 is integrated with the parallel gripper 100 system such arrangements provide more operational workspace different fingertip options and reduce grasp constraints for the robot. Moreover, this unit 502 detects transient changes in dynamic scenes (relative object motion) at a microsecond temporal resolution and acquires non-redundant information thus enabling efficient processing and real-time response of the gripper 100 system. The add-on finger unit 504 can be any soft, rigid or flexible finger or fingertips to support a grasp and application needs.

Soft robotic grippers have gained traction over the last few years owing to recent breakthroughs in multiple science and engineering disciplines. Unlike conventional grippers that are composed of rigid links and joints, soft grippers 100 utilize flexible and compliant materials, making them a better candidate in unstructured environments and in handling delicate and fragile objects compared to rigid grippers. The compliance and conformity of soft grippers 100 allow them to envelope objects of different sizes and shapes while holding them, offering considerable advantage over conventional grippers in various applications.

Soft robots should obtain constantly updated information about their internal state (proprioception) and external tactile sensing (exteroception) to achieve robust grasping and fine manipulation. However, the increased degrees of freedom (DOF) and the limited range of sensors that can be used with them present significant challenges that hinder their perception abilities and limit their applications. Vision-based sensing is an active research area that investigates whether a camera-based sensor can be utilized to acquire information about the gripper and its surroundings. Such sensors present a potential solution that can provide adequate proprioceptive and exteroceptive information for soft robotic grippers and improve their grasping and manipulation abilities.

Recently, event camera technology has emerged with its potential to revolutionize robotic vision. Unlike frame-based traditional cameras, event-based cameras detect transient changes in dynamic scenes in terms of brightness intensity. Moreover, event-based cameras have a higher temporal resolution, lower latency, efficient data processing and less power consumption compared to frame-based cameras. While performing manipulation tasks, timely detection of proprioceptive and exteroceptive features is crucial for robotic grippers/hands to effectively regulate the grip force and maintain a stable grasp. Therefore, a novel robotic gripping system that incorporates a soft compliant finger 502 and a neuromorphic event-based camera sensor 106 to refine grasping capabilities and observe proprioceptive and exteroceptive information such that the robot is superiorly able to handle different types of objects is an attractive option that is needed in various applications.

In this invention, a novel soft robotic gripper called CompliVisioTac is developed. The gripper 100 integrates a neuromorphic vision-based sensor 106 between the two sides of a soft compliant finger to acquire proprioceptive and exteroceptive information. The finger 502 can be fabricated from a single flexible material or a composite of flexible and hard materials. The side of the finger 502 that interacts with the objects should always be fabricated from a flexible material, while the other side can either be a flexible or a relatively harder material. The finger structure facilitates the mounting of different types of tactile interfaces, especially, the side that interacts with the object to transfer the information to the camera and a lighting system that is placed between the finger and the camera to improve the lighting conditions for the detection of brightness intensity. Moreover, the soft finger 502 embodiment could be extended with the optic channel 102 similar to the embodiment shown in FIG. 1. The novelty, here, is represented in the design of the soft finger with tactile capability, integration of the event-based camera 106 with a hollow two-sided finger, and the approach for acquiring the necessary proprioceptive and exteroceptive information. The finger can be used as a part of a parallel gripping system that either incorporates two similar soft fingers or the described soft finger with a conventional rigid finger.

FIGS. 6A and 6B show an example end effector 600 and tactile material 104 for use with a robotic manipulator 100. The finger 602 is a composite of a flexible and a hard material that can be 3D printed and steel pins connecting several joints in a manner that produces soft and passive complaint envelopment of objects. The steel pins connecting the joints constraint the deformation of the finger 602, increasing the force that the finger 602 can handle. The markers 608A and 608B are placed on the internal side of the joints and skin that interacts with objects 101 during the grasping process. An LED strip 105 is attached between the finger 602 and the camera 106 to provide sufficient lighting for the neuromorphic vision-based sensor 106. While deforming, the steel pins preserve the distance between the linked joints, allowing the markers to feed information to the camera about the internal state of the finger, whereas the deformed markers on the skin help obtain the curvature of skin deformation and reflect the state of the grasped object and its motion, feeding both proprioceptive and exteroceptive information to the camera 106. The event camera 106 detects illumination changes in the scene as a stream of events with a microsecond temporal resolution and latency and processes them continuously to produce useful information that can be utilized to achieve robust grasping, regulate the gripper force, and maintain object stability when uncertainties such as slip occur.

The soft finger tactile interface 104 is a tool that can interact with objects/targets and provide sensory feedback about the interaction. CompliVisioTac facilitates the mounting of different types of soft/flexible skins on the finger structure shown in FIG. 6B. The tactile interfaces 104 can be or include a flexible-hard skin and/or a flexible soft skin. The flexible-hard skin can be or include a transparent rigid flexible layer that offers cheap finger replacements, minimizes wear and tear, and remains unaffected by the weight, material-type, and geometry of the object. The soft skin refers to a deformable opaque skin or a specialized occluded skin with embedded markers. In various embodiments, different soft skins can be utilized to provide customized sensitivity while grasping a wide range of objects. The different tactile interfaces and the soft finger structure enables a safe, adaptive, and precise handling of a wide class of objects, i.e., fragile, complex, soft, light, heavyweight, etc., including delicate and deformable items like commercial food. In some embodiments, the soft finger tactile interface can be customized based on the gripper actuation mechanism, finger structure 104, operational environment, targets to be handled, available size of the camera 106, and requirements of tactile sensing. Both frame-based and event-based cameras can be utilized for vision-based tactile sensing. However, the main purpose of the invention is to avail the neuromorphic sensing capability for soft finger without negatively affecting its compliance and conformity.

Figure 7A:
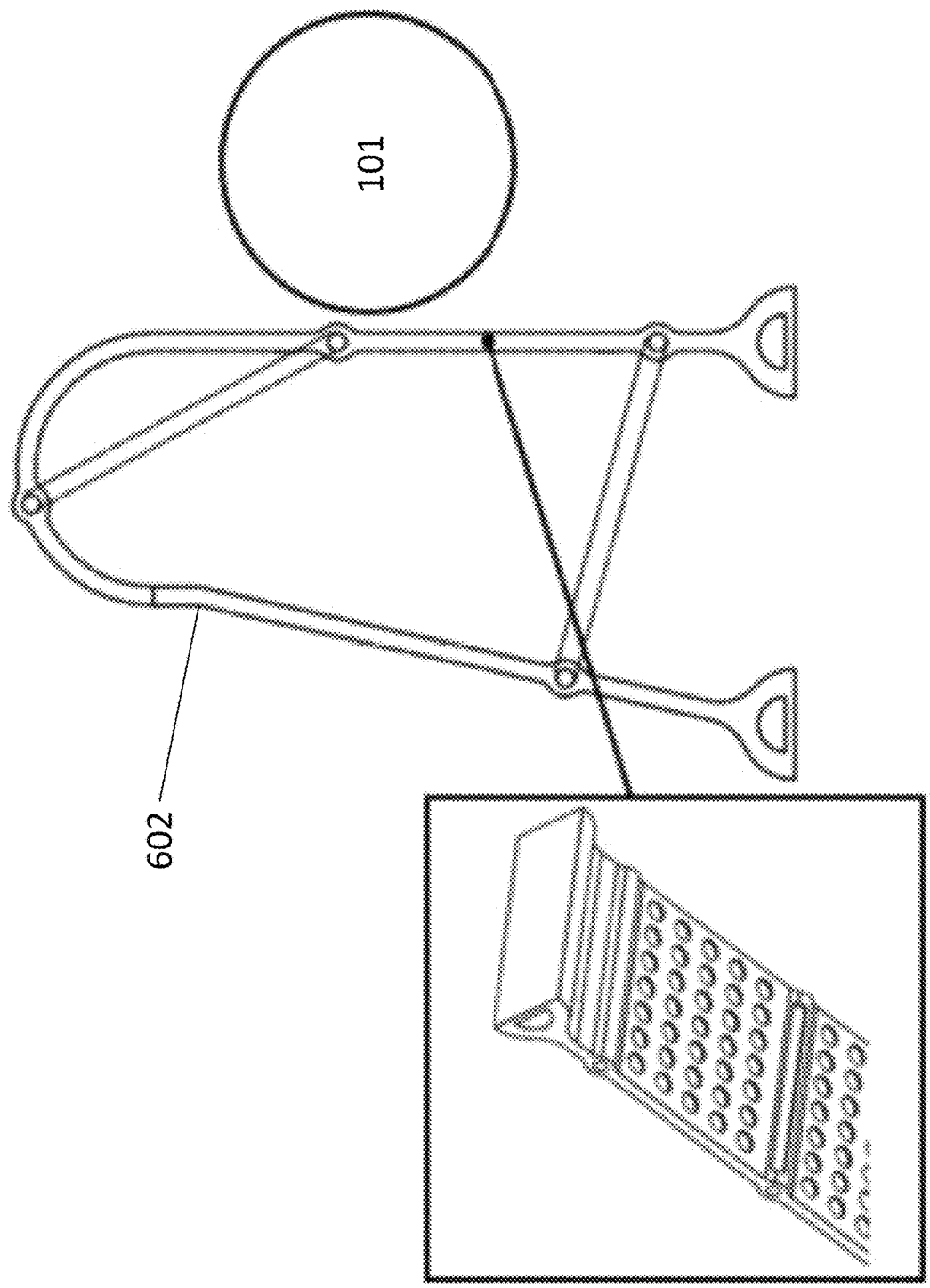
FIG. 7A shows the end effector of FIG. 6A prior to contacting an object, in accordance with various embodiments.
Figure 7B:
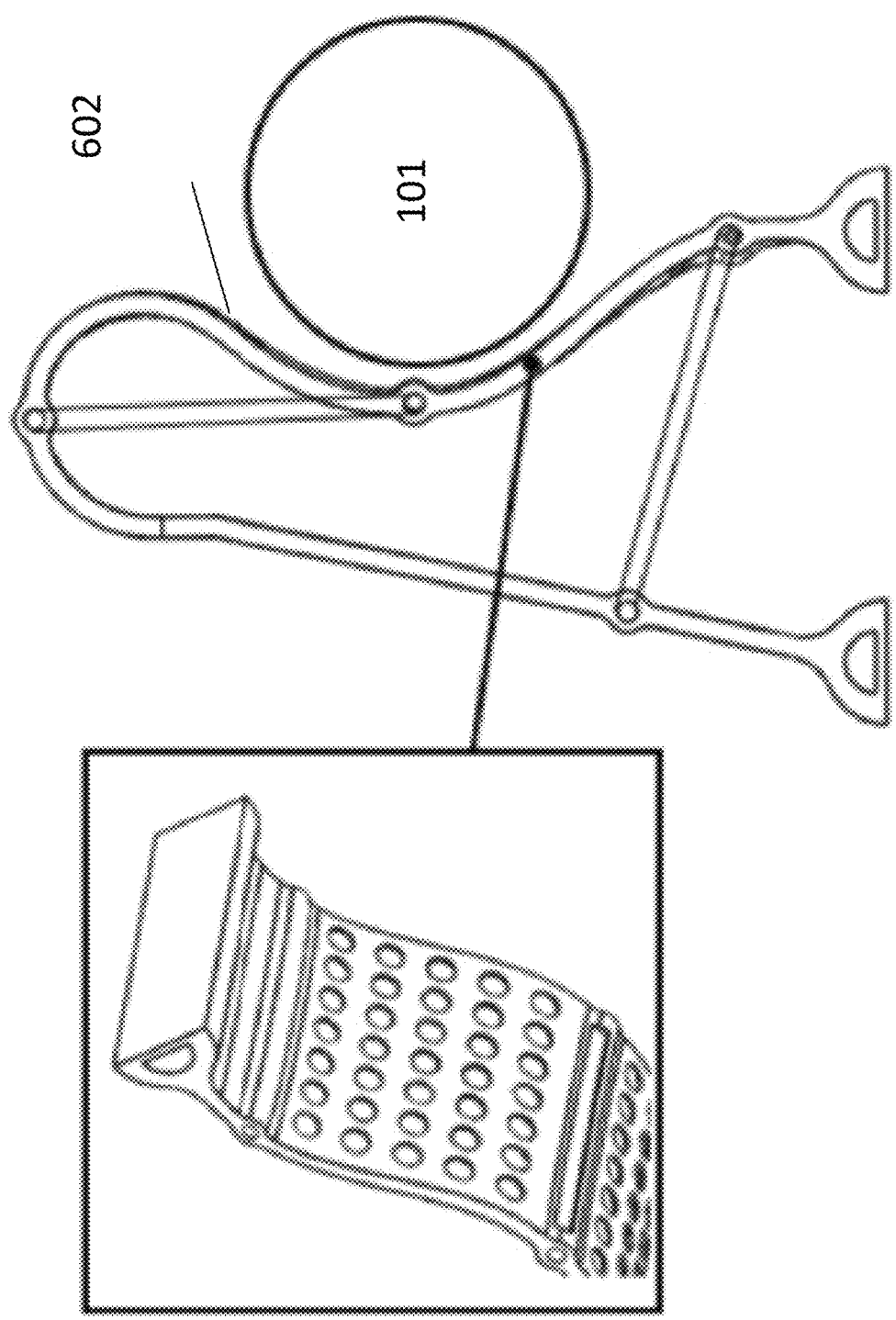
FIG. 7B shows the end effector of FIG. 6A after contacting the object, in accordance with various embodiments.

FIG. 7A shows the end effector 602 of FIG. 6A prior to contacting an object and FIG. 7B shows the end effector 602 of FIG. 6A after contacting the object. It is worth mentioning that conventional frame-based cameras can be utilized in our proposed design. However, the main purpose of the invention is to avail the neuromorphic sensing capability using the event camera.

Joint connections and composite materials are two possible approaches to increase the feasible range of applied force. The choice of finger 602 design and material selection depends on the application and the force that will be applied on the finger 602. For manipulating extremely soft and small objects, a finger from homogenous flexible material without joint connections might be sufficient. Such design is simple and cost-effective but can handle limited range of objects. Manipulating a wider range of objects of different sizes and materials would require a finger 602 that is capable of grasping with higher forces. Such capability comes with greater complexity and higher cost and can be achieved through joint connections and incorporating a hard side of the finger. Moreover, joint connections provide the camera with a different kind of information that helps in obtaining the proprioception of the finger. CompliVisioTac can utilize any of these finger 602 configurations depending on the application.

Figure 8:
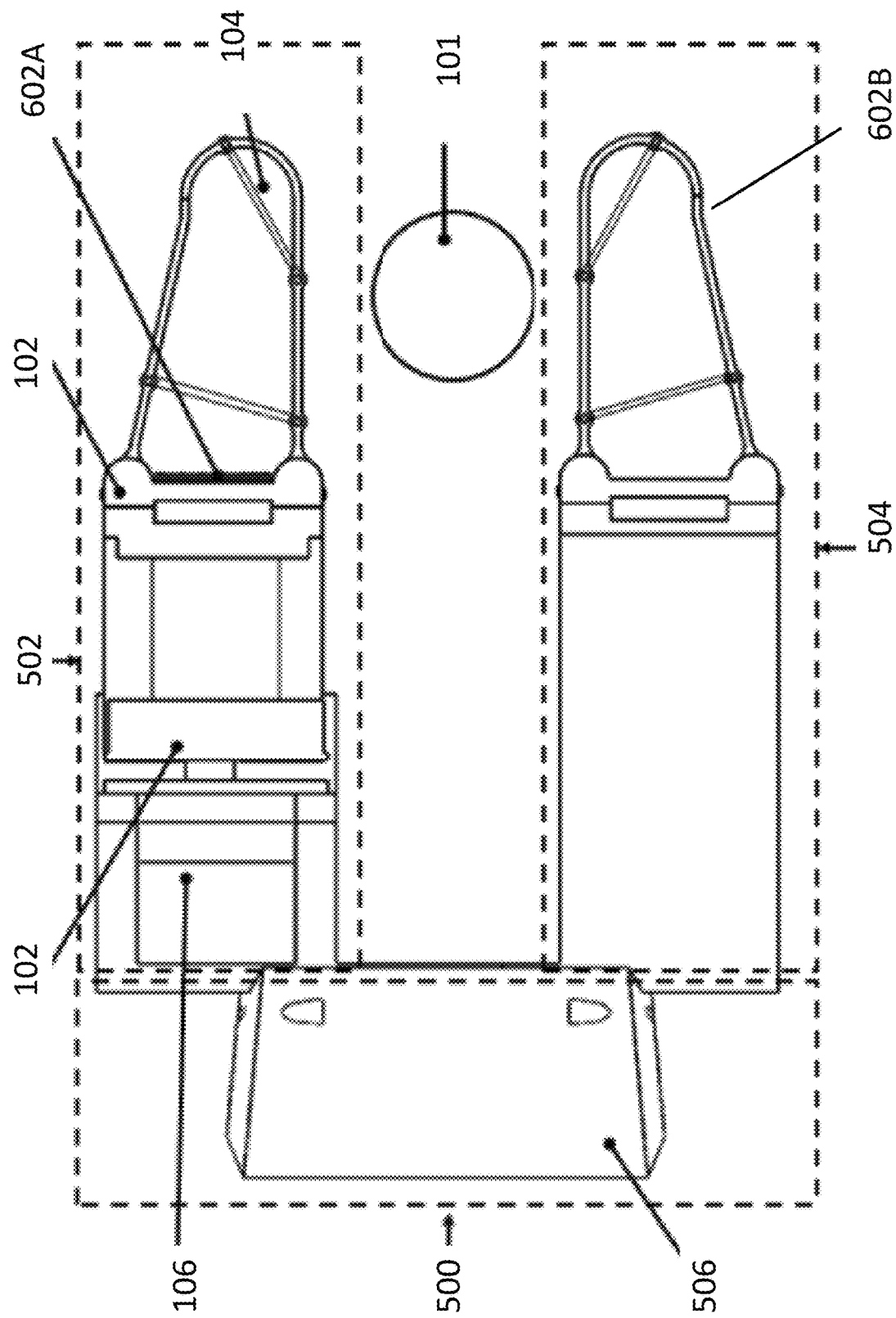
FIG. 8 shows an example robotic manipulator including multiple end effectors of FIG. 6A, in accordance with various embodiments.
Figure 9:
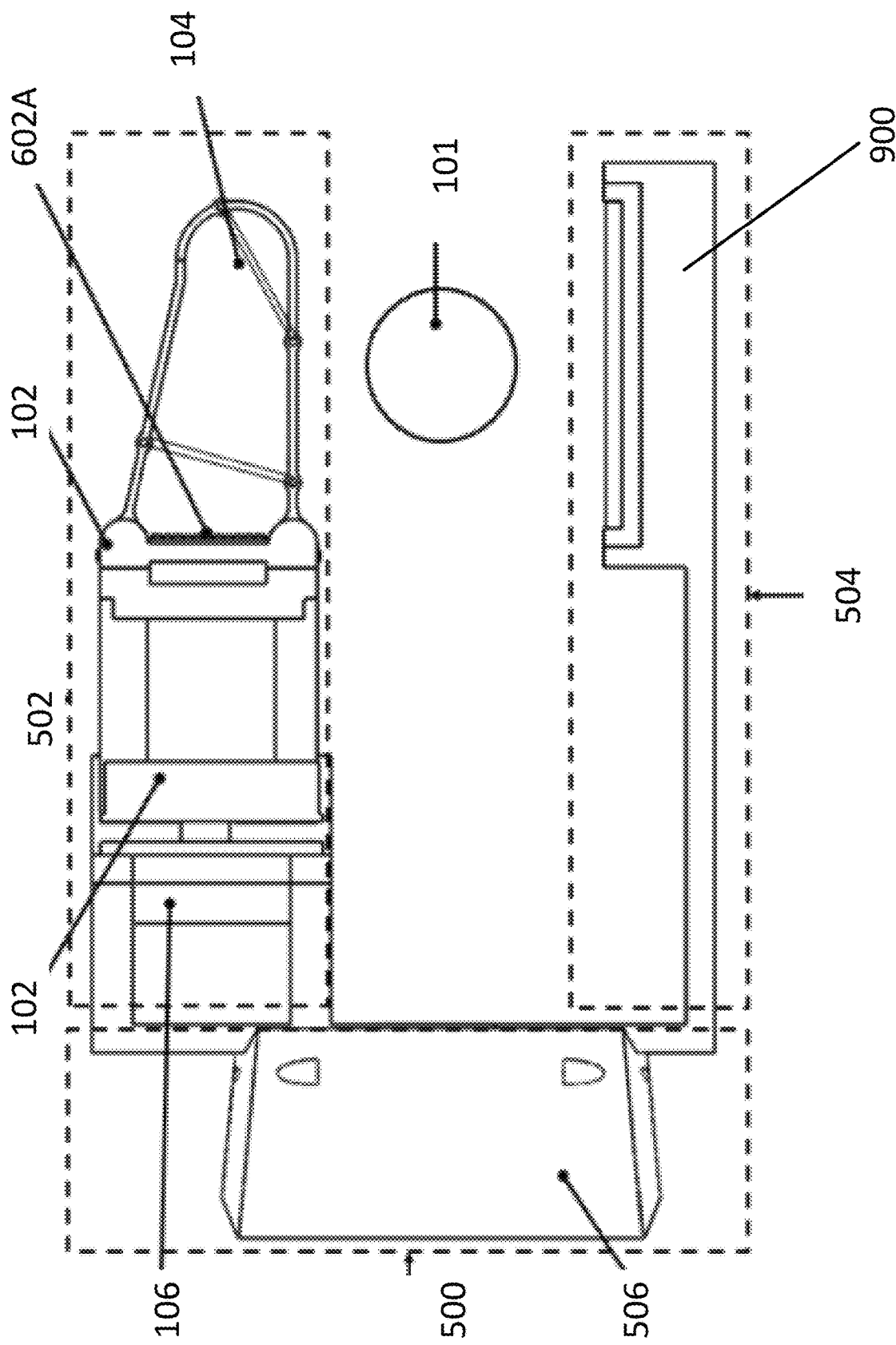
FIG. 9 shows another example robotic manipulator including a single end effector of FIG. 6A, in accordance with various embodiments.

FIG. 8 shows an example robotic manipulator 100 including multiple end effectors of FIG. 6A, and FIG. 9 shows another example robotic manipulator 100 including a single end effector of FIG. 6A. The actuation unit enables the finger 602 to move in parallel motion in relation to the gripper body and facilitates the attachment of custom-made fingers 602. The compliant finger unit 600 comprises the vision-based sensor, LED strip and soft finger as shown in FIG. 6A. With the proposed finger 602 structure, the parallel motion induced by the actuation unit is enough to allow the finger 602 to envelope the object and adapt to its shape. The add-on unit 504 can be any soft or rigid finger. FIG. 8 shows a homogenous approach where the add-on unit 504 comprises of a soft finger 602B similar to soft finger unit 602A, whereas FIG. 9 shows a heterogenous approach with an add-on unit 504 that has a hard finger equipped with conventional sensors. The proposed soft gripper 100 is able to handle objects that are delicate, fragile, deformable and lightweight. CompliVisioTac with its novel design and sensing ability can overcome the general limitations found in soft grippers such as precision, robustness, scalability and controllability.

With the overwhelming capability and advantages of the proposed gripper, technological advancements towards better perception capabilities, slip detection and suppression, object pose estimation, force estimation and control will bring a paradigm shift in diverse applications such as the factory automation of food, toy, meat and grocery industry. Moreover, the invention can be equipped in mobile manipulator/robots to handle objects especially in service sector and human-centered environments. To the best of our knowledge, none of the earlier gripping systems utilizes a passive soft finger with neuromorphic vision-based sensing and skin and joint markers to superiorly extract proprioceptive and exteroceptive information.

Figure 10:
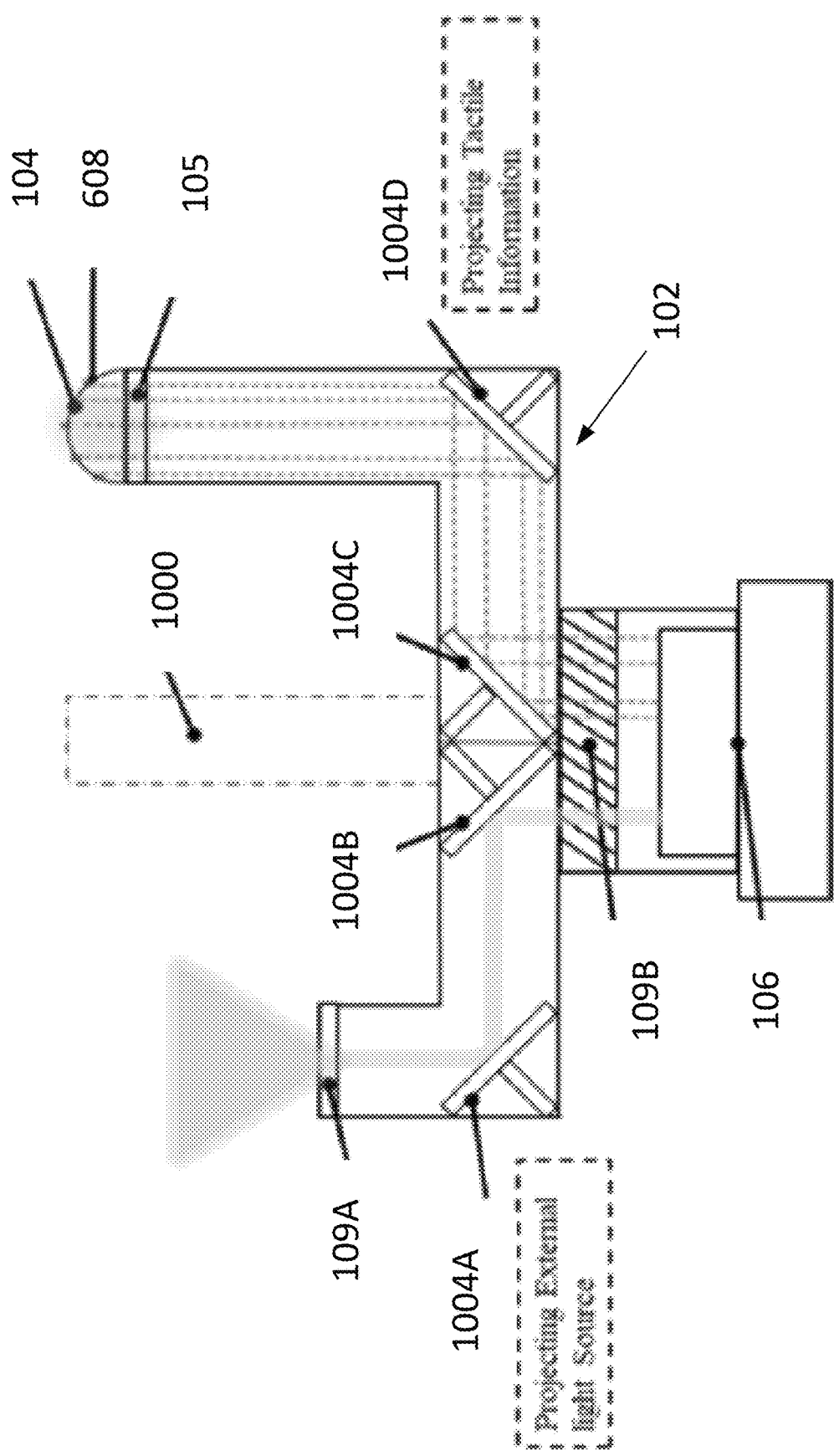
FIG. 10 shows an example end effector including an optical sensor and a tactile sensor, in accordance with various embodiments.

In this invention, we propose a novel sensor configuration that can provide pose and contact force estimations using a single vision sensor 106. As shown in FIG. 10, light is propagated to the camera 106 from two sources. The first source passes light from the external environment into the vision sensor 106 and thus enables visual feedback on the machining tool's surroundings. This visual feedback is key for the initial positioning of the tool using a variety of visual guidance and servoing techniques. The second source of light is internal and is used to provide tactile information during the machining process. Light Is first reflected from the inner surface of a soft-tactile interface 104 prior to propagating to the vision sensor 106 through a set of mirrors. Several visual markers 608 are distributed along the inner surface of the tactile interface 104 in a known pattern. When the machining tool 1000 achieves contact with an external body, the tactile interface 104 deforms, and the markers' distribution patterns are altered. By observing the deformation of the tactile interface 104 through changes in the visual markers' pattern, contact forces and pose can be estimated.

Figure 11:
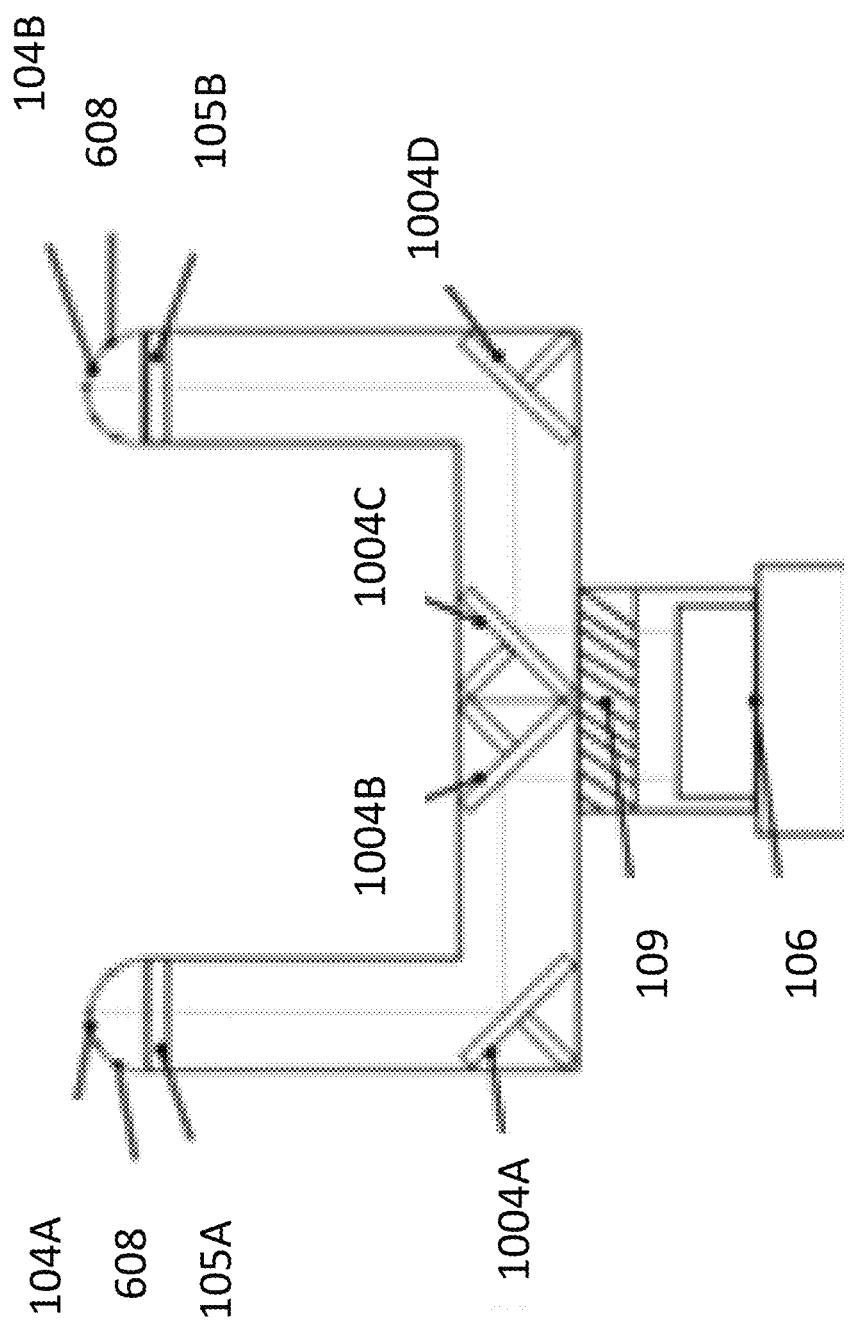
FIG. 11 shows an example end effector with tactile sensors, in accordance with various embodiments.

FIG. 10 shows an example end effector including an optical sensor and a tactile sensor. Using a set of mirrors 1004A-D, the same camera 106 can monitor external surroundings and provide tactile information by observing the deformation in a soft tactile interface. The proposed sensor configuration offers considerable advantages over conventional perception methods currently used for machining applications in terms of cost, power consumption, maintainability, and flexibility. As only a single sensing element is needed, production cost and power consumption are significantly reduced and no sensor synchronization procedure is required. Additionally, most parts of the proposed sensor can be easily fabricated or 3D printed with a low cost. As such, the presented interface is easy to maintain and offers great customization potential to fit specific requirements by simply adjusting the sensor's dimensions, placement, and tactile interface. For instance, as the tactile interface is separated from the sensing element, different tactile interfaces with different stress-strain properties can be easily replaced offering a low-cost trade-off between resolution and range for the contact force estimation problem. In a similar manner, the sensor can be customized in terms of the number of contact points with tactile feedback. FIG. 11 shows an example end effector with tactile sensors. As illustrated in FIG. 11, the visual servoing element can be swapped for another tactile interface; which passively stabilizes the machining tool 1000 and enables the sensor to observe contact torques. The same concept can be further extended to three and more contact points as showcased in FIG. 12, which shows another example end effector with tactile sensors 104. Another customization possibility is the number of cameras utilized in the sensor. As manufacturers are racing to develop smaller and more efficient cameras, the proposed sensor can be adjusted to fit multiple cameras each for a specific sensing task as showed in.

Figure 12:
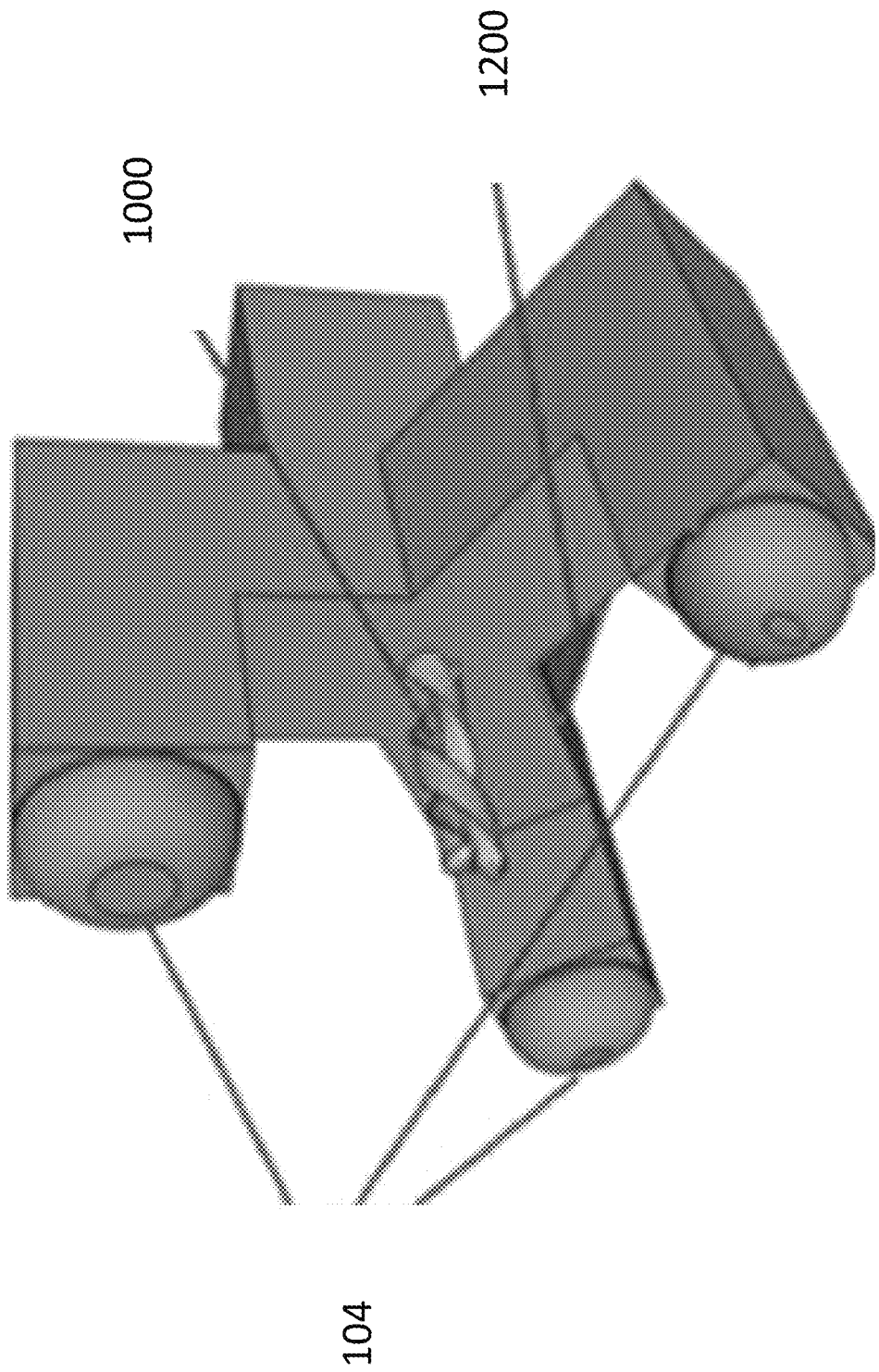
FIG. 12 shows another example end effector with tactile sensors, in accordance with various embodiments.
Figure 13:
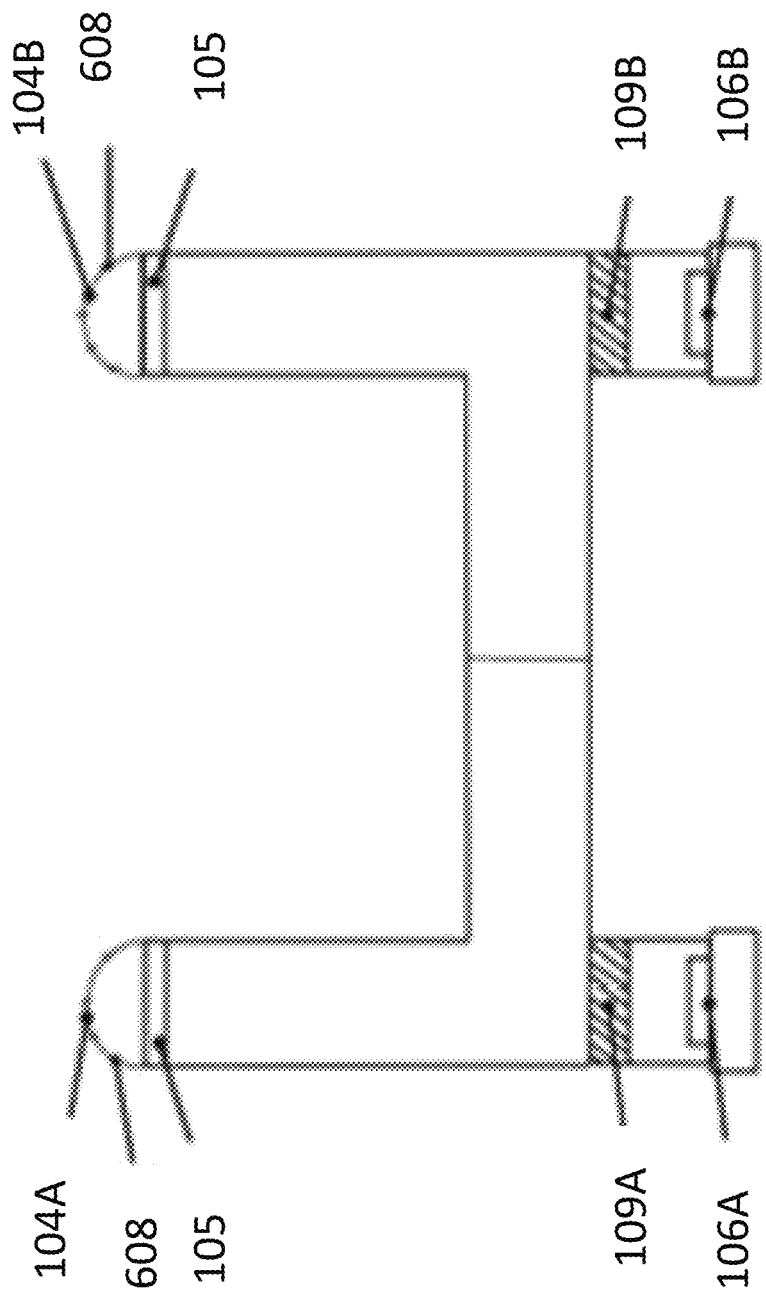
FIG. 13 shows an example end effector with tactile sensors and optical sensors, in accordance with various embodiments.

The proposed invention can be customized for multi-point tactile feedback. For example, as shown in FIG. 11, a two-point tactile sensing configuration using a single camera. The same concept can be extended for more than two contact points in 3D as shown in FIG. 12. The proposed sensor design can embed multiple cameras 106A, 106B for easier fabrication of the sensor housing, for example, as shown in FIG. 13. This design can be feasible as manufacturers develop smaller and more efficient cameras. The proposed invention holds value for a wide spectrum of machining processes such as drilling and grinding up to electronics manufacturing. While the specific machining tool 1000 can be different, the fundamental concepts of the sensor remain the same. To better illustrate the presented concept, FIG. 14 presents a typical use case of the proposed sensor in a robotic drilling scenario.

Figure 14A:
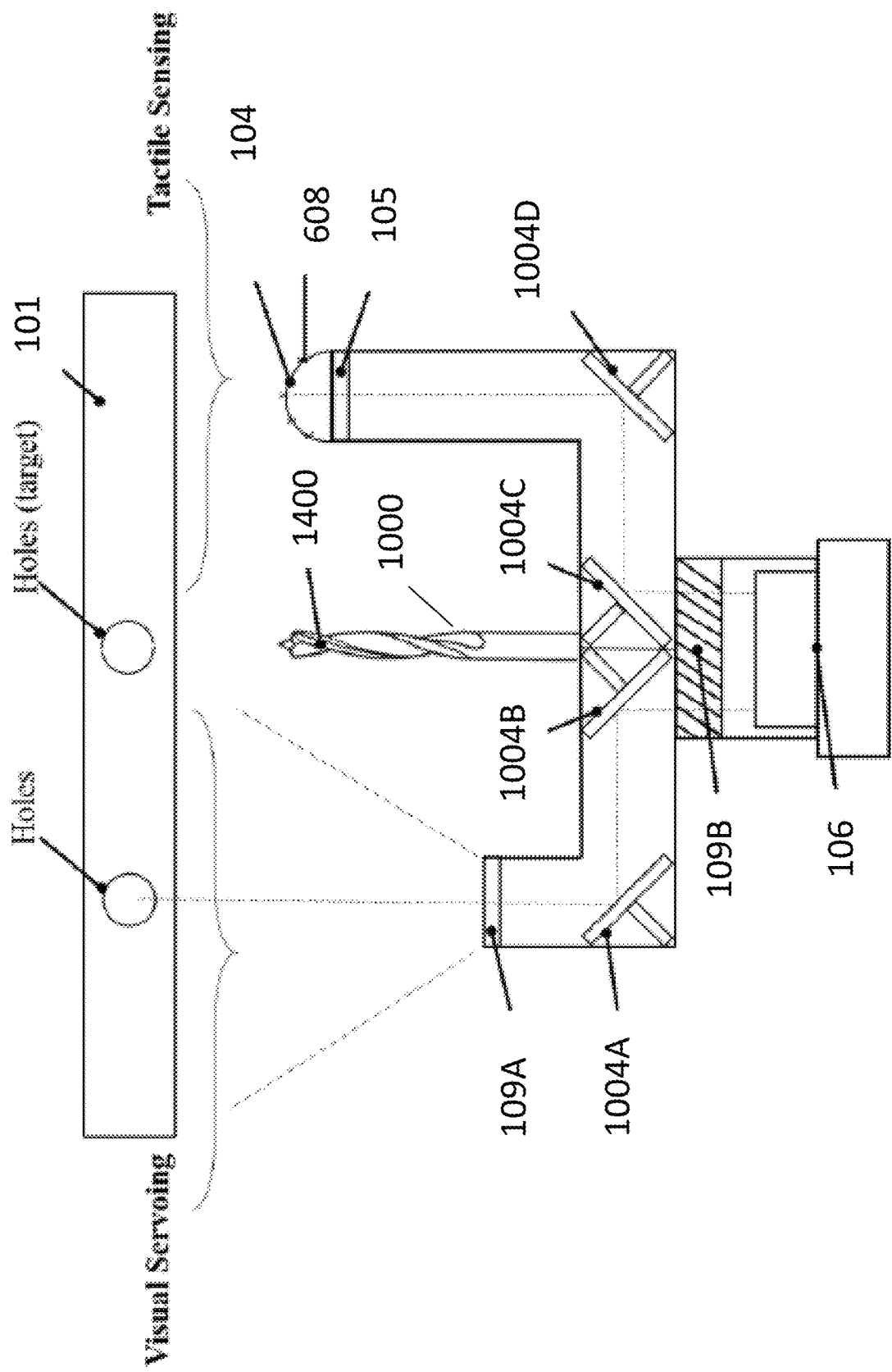
FIG. 14A shows the end effector of FIG. 10 positioned near a workpiece, in accordance with various embodiments.
Figure 14B:
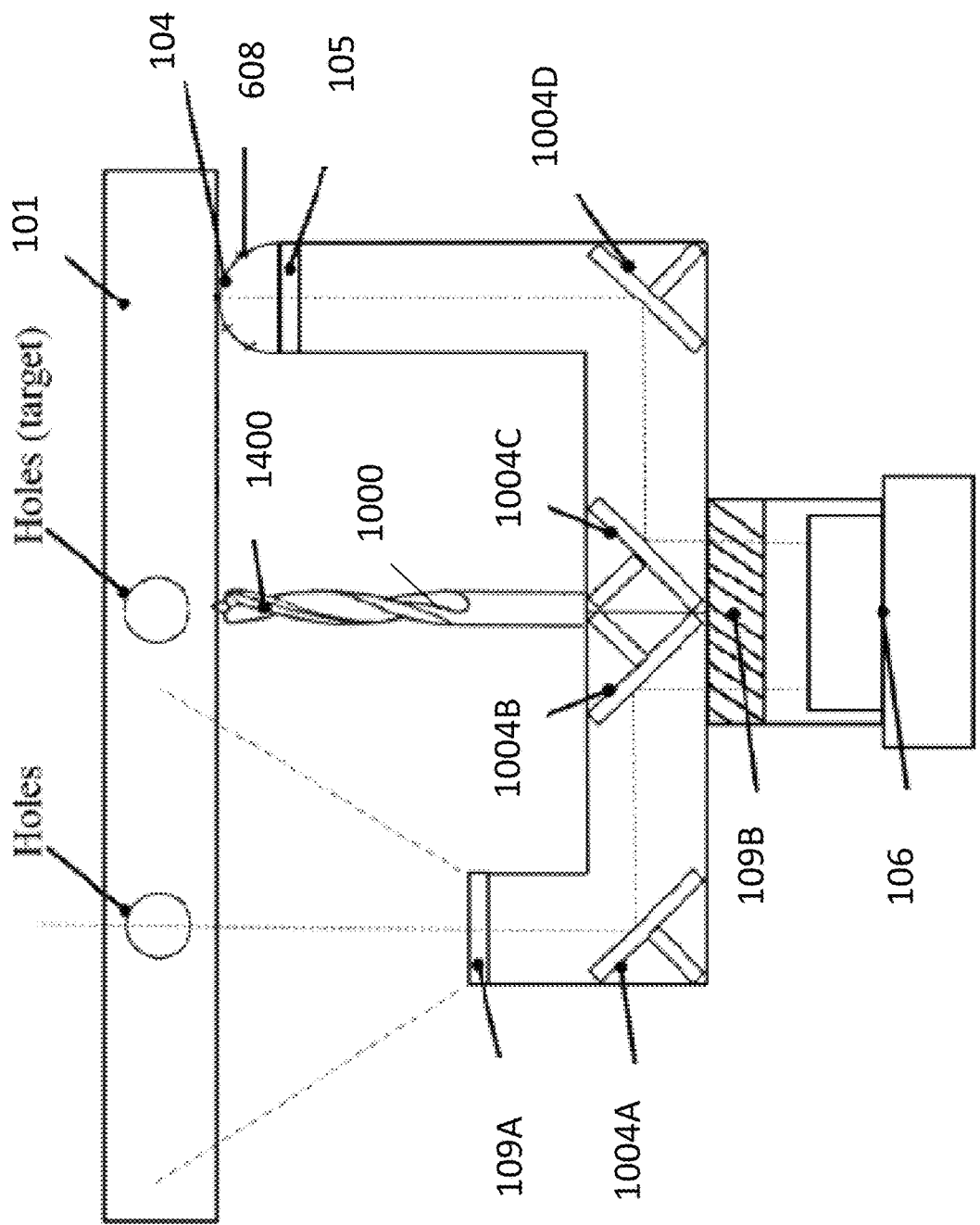
FIG. 14B shows the end effector of FIG. 10 aligned with the workpiece, in accordance with various embodiments.
Figure 14C:
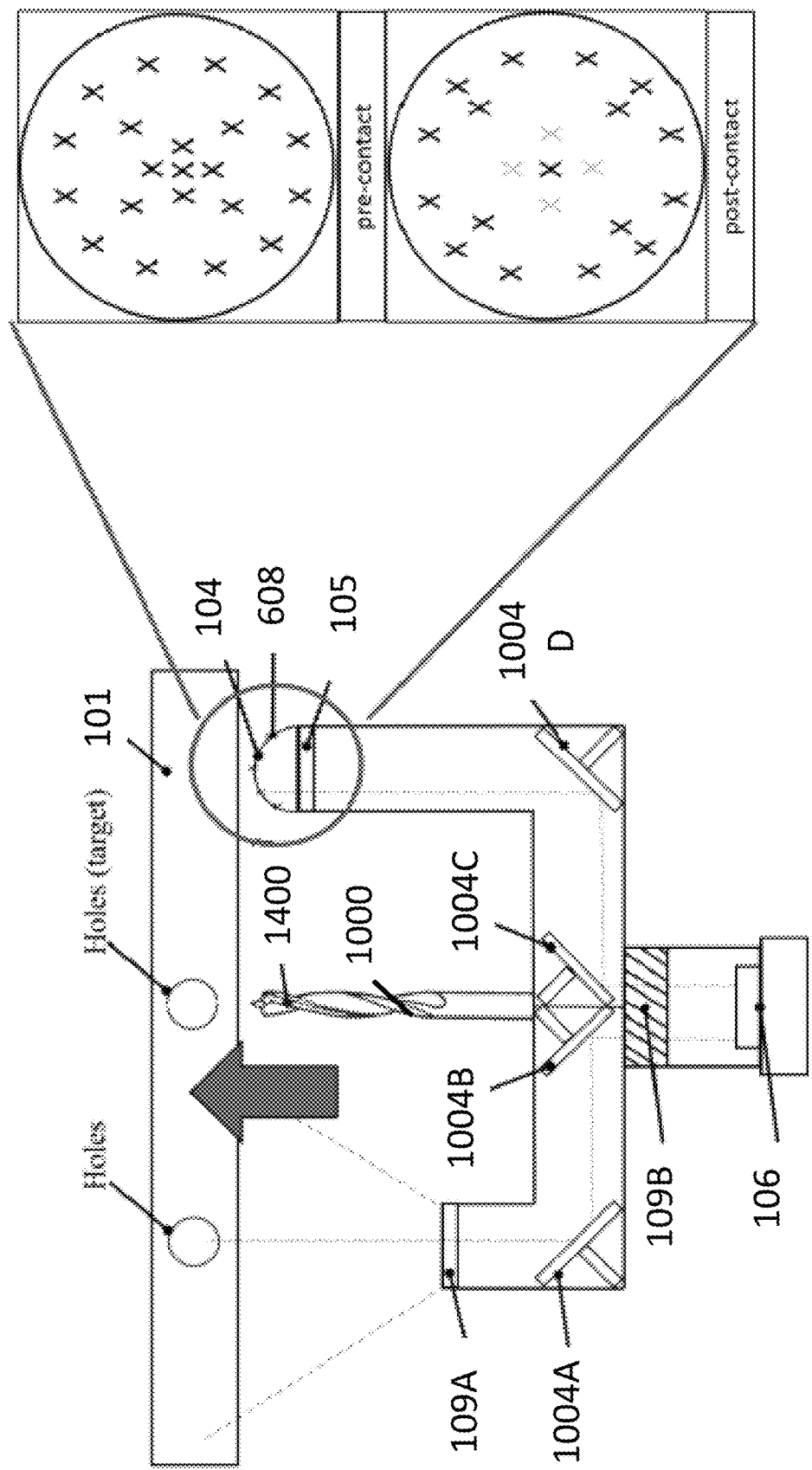
FIG. 14C shows the end effector of FIG. 10 positioned for machining of the workpiece, in accordance with various embodiments.

FIGS. 14A through 14C illustrate an example use case of the proposed sensor for robotic drilling applications. FIG. 14A shows the proposed sensor is equipped in a machining tool 1000 with a drill bit. FIG. 14B shows the drill bit driven towards initial alignment with the workpiece using visual feedback from the sensor's aperture 106. FIG. 14C shows once the drill bit 1000 is aligned, it is driven towards the target workpiece which causes the tactile interface 104 to deform. The camera 106 observes this deformation through the displacement of several pre-defined markers within the tactile interface 104. Contact forces can then be estimated from the observed deformation using computer vision and machine learning algorithms. The presented sensor is generic in terms of the type of the utilized camera. However, dynamic vision cameras (Neuromorphic) which output the changes in brightness independently and asynchronously for each pixel would be a better fit for the required optical tasks due to their microsecond level latency. The high dynamic range of dynamic vision cameras is also a key feature for our sensor as light is propagated to the camera from multiple sources that might have different lighting conditions. These cameras are also less susceptible to under/over exposure and motion blur and only require milliwatt level power; which greatly expands the possible use cases for the presented invention. Major manufacturers are also investing heavily in dynamic vision technologies to produce smaller, cheaper, and higher resolution cameras; which can make the use of dynamic vision sensors in industrial application more economically and technically feasible.

The main challenges with the proposed invention are the requirement for a precise calibration procedure that takes into account small displacements in the sensor elements as well as the camera intrinsic distortions. Additionally, certain complications might arise in terms of the optical properties of light propagation as different lenses with different focus levels might be required for each of the two perception problems of visual guidance and visual tactile sensing.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A robotic manipulator, comprising:
   an end effector configured to engage with an object;
   sensors positioned on the robotic manipulator, each of the sensors configured to detect data associated with the object; and
   an actuator coupled with the end effector and configured to move a portion of the end effector relative to the robotic manipulator;
   wherein the sensors comprise a tactile sensor configured to engage with the object; and
   wherein the tactile sensor comprises one or more transparent rigid layers, configured to engage with the object and allow light to travel through the one or more layers.

2. The robotic manipulator of claim 1, wherein the sensors comprise an optical sensing system comprising an optical sensor and optic mirrors positioned to direct light to the optical sensor.

3. The robotic manipulator of claim 2, wherein at least one optic mirror is positioned on the moving portion of the end effector.

4. The robotic manipulator of claim 3, wherein the actuator is further configured to move the portion of the end effector between a closed position where the end effector is engaged with the object and an open position where the end effector is positioned adjacent to the object, wherein when the end effector is in the closed position, the at least one optic mirror is aligned to direct light reflected by the object to the optical sensor.

5. The robotic manipulator of claim 1, wherein the sensors comprise a neuromorphic vision-based sensor or an event-based camera.

6. The robotic manipulator of claim 1, wherein the one or more transparent rigid layers comprise an engagement surface configured to deform in response to engagement with the object.

7. The robotic manipulator of claim 1, wherein the sensors further comprise an optical sensing system comprising an optical sensor and one or more optic mirrors configured to direct light traveling through the one or more layers to the optical sensor.

8. The robotic manipulator of claim 1, wherein the sensors comprise an optical sensor that is configured to detect event based data associated with the object.

9. The robotic manipulator of claim 8, wherein the end effector is a first end effector and the robotic manipulator further comprises a second end effector attached to the robotic manipulator in a fixed position and comprising an engagement area configured to engage with the object.

10. The robotic manipulator of claim 1, wherein the sensors comprise an optical sensor positioned to detect data associated with the object and a tactile sensor configured to engage with the object.

11. The robotic manipulator of claim 1, wherein the end effector comprises a compliant, rigid, or semi-rigid structure.

12. The robotic manipulator of claim 1, wherein the end effector is a first end effector and the robotic manipulator further comprises a second end effector coupled with the robotic manipulator.

13. The robotic manipulator of claim 12, wherein the first and second end effectors have respective first and second engagement surfaces, the first and second engagement surfaces being configured to engage with the object.

14. The robotic manipulator of claim 13, wherein the first and second engagement surfaces comprise a marker-based occluded surface, a marker-less opaque surface, or a transparent soft surface.

15. A robotic manipulator, comprising:
   an end effector configured to engage with an object, the end effector having a compliant, rigid, or semi-rigid structure and comprising an engagement surface configured to engage with an object, the engagement surface comprising a flexible material; and
   an optical sensor positioned to detect data associated with the object through the engagement surface.

16. The robotic manipulator of claim 15, wherein the optical sensor is configured to detect vision or tactile information using an event-based optical sensor.

17. The robotic manipulator of claim 15, further comprising a light source coupled with end effector and configured to illuminate the object.

18. The robotic manipulator of claim 15, wherein the optical sensor comprises an event-based camera configured to detect illumination changes associated with the object.

* * * * *